United States Patent
Narasimha et al.

(10) Patent No.: US 10,616,774 B2
(45) Date of Patent: Apr. 7, 2020

(54) METHOD AND DEVICE FOR COMMUNICATIONS IN MILLIMETER-WAVE NETWORKS

(71) Applicant: Futurewei Technologies, Inc., Plano, TX (US)

(72) Inventors: Murali Narasimha, Vernon Hills, IL (US); Yuyang Wang, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/007,593

(22) Filed: Jun. 13, 2018

(65) Prior Publication Data

US 2019/0253900 A1   Aug. 15, 2019

Related U.S. Application Data

(60) Provisional application No. 62/628,742, filed on Feb. 9, 2018.

(51) Int. Cl.
*H04W 16/28* (2009.01)
*H04W 4/02* (2018.01)
*H04W 72/04* (2009.01)

(52) U.S. Cl.
CPC .......... *H04W 16/28* (2013.01); *H04W 4/025* (2013.01); *H04W 72/046* (2013.01)

(58) Field of Classification Search
CPC .... H04W 16/28; H04W 4/025; H04W 72/046
See application file for complete search history.

(56) References Cited

U.S. PATENT DOCUMENTS

| 10,326,546 | B2 * | 6/2019 | El Ayach | ............. H04J 11/0086 |
| 2016/0182163 | A1 | 6/2016 | Guey et al. | |
| 2017/0064748 | A1 | 3/2017 | Cai et al. | |

FOREIGN PATENT DOCUMENTS

CN   106464330 A   2/2017

* cited by examiner

*Primary Examiner* — Chandrahas B Patel
(74) *Attorney, Agent, or Firm* — Slater Matsil, LLP

(57) ABSTRACT

Methods and apparatus are provided to realize mm-wave communication. In an embodiment, a network device inputs a user equipment (UE) location into a beam prediction engine to generate a set of mm-wave beams, and the beam prediction engine generating the set of mm-wave beams based on at least one static object within a coverage area of an access device. The network device inputs at least one mobile object location of at least one mobile object into the beam prediction engine to select a subset of mm-wave beams from the set of mm-wave beams, and the beam prediction engine selecting the subset of mm-wave beams based on the at least one static object and the at least one mobile object. The network device selects a mm-wave beam from the subset of mm-wave beams.

20 Claims, 22 Drawing Sheets

METHOD AND DEVICE FOR COMMUNICATIONS IN MILLIMETER-WAVE NETWORKS

TECHNICAL FIELD

The present disclosure relates to wireless communications, particularly, relates to millimeter-wave (mm-wave) communications.

BACKGROUND

With the rapid growth of communications, the resource shortage in global bandwidth becomes more serious. Due to the abundant mm-wave bandwidth, new communication systems are being designed to use mm-wave bands.

A mm-wave communication system may use beam forming and narrow beams to overcome the high path-loss that is experienced at high frequencies. The use of narrow beams make mm-wave communications challenging.

SUMMARY

In a first aspect, a mm-wave communication method is provided. In the method, an access device and user equipment (UE) may respectively determine at least one transmission path between the access device and the UE in accordance with a prediction function parameter, and a location of the UE and a location of at least one mobile object. The access device and the UE may further determine a mm-wave beam respectively according to the transmission path. Then the access device and the UE may communicate with each other via the determined mm-wave beam.

The transmission path may be represented by a predicted ray between the access device and the UE. The ray that transmits from a location of the access device and can reach the location of the UE may be predicted according to the prediction function parameter, the location of the UE and the location of the at least one mobile object. The location may be represented by location information. The location information may comprise geographical location information, such as coordinates. The location information may further comprise height information or altitude information.

In the mm-wave communication, the access device and the UE may determine the suitable mm-wave beam directly in accordance with the prediction function parameter and the mobile object information. Therefore, the access device and the UE do not need to search all of the beams of the UE and the access device. This can reduce mm-wave beam acquisition time and can minimize overhead that would result from an exhaustive one-by-one beam search. It makes the mm-wave communication more successful and the use of system resources will be more economical. Furthermore, with consideration of the mobile object, the mm-wave communication between the access device and the UE has less possibility to be interrupted by the mobile object.

In a possible implementation of the method according to the first aspect, the prediction function parameter may be determined by the access device or by a network node. When the prediction function parameter is determined by the network node, the network node may transmit the prediction function parameter to the access device, and the access device transmits the prediction function parameter to the UE. With the assistance of the network node, it can alleviate the burden of the access device, and can make the network management more efficient.

In a possible implementation of the methods according to the first aspect and the above implementation, the access device and the UE may have a wireless cellular connection. The access device may transmit the prediction function parameter to the UE via the wireless cellular connection. Alternatively, the access device may broadcast the prediction function parameter in a broadcast channel of a mm-wave communication system to the UE.

In a possible implementation of the methods according to the first aspect and the above implementations, the prediction function parameter may be determined according to machine learning. The machine learning can be realized based on a simulated result from a ray tracing simulation. According to machine learning, it may improve the efficiency to determine the prediction function parameter. Optionally, the prediction function parameter may be updated periodically or based on an event.

In a possible implementation of the methods according to the above implementations, in the ray tracing simulation, at least one simulated mobile object is considered. Therefore, such ray tracing simulation can make the prediction of the ray and transmission path suitable for practical scenarios. A ray may be identified in the ray tracing simulation according to static object information of an area at where the access device is located, location information of simulated UE, location information of the access device, and location information of a simulated mobile object. The static object information may comprise two dimensional or three dimensional geographical information, or map information. Optionally, to make the simulation more accurate, the location information may further comprise height information or altitude information.

In a possible implementation of the methods according to the above implementations, a prediction function may be determined based on the simulated result including an angle of arrival (AoA) and an angle of departure (AoD) of the identified ray and location information of a simulated UE where the identified ray reaches. Accordingly, the prediction function parameter then be determined.

In a possible implementation of the methods according to the above implementations, the prediction function is a polynomial function of the location of the UE and the location of the at least one mobile object.

In a possible implementation of the methods according to the first aspect and the above implementations, the mm-wave beam determined by the access device may comprise a receiving mm-wave beam. The access device may determine the receiving mm-wave beam according to a number of the transmission path that maps to a mm-wave beam pattern of the access device. The access device may map the at least one transmission path to multiple mm-wave beams of the access device, and determine a number of at least one transmission path mapped to each one of the multiple mm-wave beams of the access device. Then the access device may determine a mm-wave beam having a maximum number of the mapped at least one transmission path as the receiving mm-wave beam of the access device. Alternatively, the receiving mm-wave beam may be determined according to a beam pair determined by the UE. When the UE determines the beam pair, the UE may send information of the beam pair to the access device, the access device may determines a receiving mm-wave beam in the beam pair as the receiving mm-wave beam of the access device. Optionally, multiple mm-wave beams may be determined as receiving mm-wave beams. Thus, it can improve the success possibility of receiving signals in the uplink transmission.

In a possible implementation of the method according to the first aspect and the previous implementations, the mm-wave beam determined by the access device may comprise a transmitting mm-wave beam. The access device determines at least one beam pair and each one of the beam pair covering at least one transmission path. The access device determines a transmitting mm-wave beam in a beam pair with a largest number of the at least one transmission path as the transmission of the access device. Alternatively, the access device may assign a weight to each one of the at least one transmission path, and determine a sum of weights of all transmission path in each one of the at least beam pair. The access device then determines a transmitting mm-wave beam in a beam pair with a largest summed weights as the transmitting mm-wave beam of the access device. Such implementation may improve the success rate of mm-wave transmission, reduce the path loss in the communication. Meanwhile, the power consumption may be minimized for the access device.

In a possible implementation of the method according to the first aspect and the previous implementations, the mm-wave beam determined by the UE may comprise a receiving mm-wave beam of the UE. The UE may determine the receiving mm-wave beam according to a number of the transmission path that maps to a mm-wave beam pattern of the UE. The UE may map the at least one transmission path to multiple mm-wave beams of the UE, and determine a number of at least one transmission path mapped to each one of the multiple mm-wave beams of the UE. Then the UE may determine a mm-wave beam having a maximum number of the mapped at least one transmission path as the receiving mm-wave beam of the UE. When the access device determines the beam pair, the UE may receive information of the beam pair from the access device, the UE may determines a receiving mm-wave beam in the beam pair as the receiving mm-wave beam of the UE. Optionally, multiple mm-wave beams may be determined as receiving mm-wave beams. Thus, it can improve the success possibility of receiving signals in the uplink transmission.

In a possible implementation of the method according to the first aspect and the previous implementations, the mm-wave beam determined by the UE may comprise a transmitting mm-wave beam of the UE. The UE determines at least one beam pair and each one of the beam pair covering at least one transmission path. The UE determines a transmitting mm-wave beam in a beam pair with a largest number of the at least one transmission path as the transmitting mm-wave beam of the UE. Alternatively, the UE may assign a weight to each one of the at least one transmission path, and determine a sum of weights of all transmission path in each one of the at least one beam pair. The UE then determine a transmitting mm-wave beam in a beam pair with a largest summed weights as the transmitting mm-wave beam of the UE. Such implementation may improve the success rate of mm-wave transmission, reduce the path loss in the communication. Meanwhile, the power consumption may be minimized for the UE.

In a possible implementation of the methods according to the first aspect and the above implementations, the weight may be assigned according to at least one of a length of the at least one transmission path, a number of reflections and/or refractions on the at least one transmission path, or a position of the at least one of the transmission path in a receive beam pattern of the UE and in a transmit beam pattern of the access device. According to the implementation, the mm-wave communication may be realized in the shortest path, with the lowest path loss, and with the strongest radiation. The mm-wave communication quality can be improved accordingly.

In a second aspect, a user equipment is provided. The user equipment comprises a processor, the processor is configured to determine at least one transmission path between the UE and an access device in accordance with a prediction function parameter, and a location of the UE and a location of at least one mobile object. The processor is further configured to determine a mm-wave beam according to the transmission path. The transceiver is configured to communicate with the access device via the mm-wave beam determined by the processing unit. The transceiver is further configured to receive the prediction function parameter from the access device. The processor and the transceiver may be applied to implement the above possible implementations.

In a third aspect, an access device is provided. The access device comprises a processor. The processor may be configured to determine at least one transmission path between the access device and a UE in accordance with a prediction function parameter, and a location of the UE and a location of at least one mobile object. The processor is further configured to determine a mm-wave beam according to the transmission path. The processor may be further configured to perform a ray tracing simulation to identify a ray that transmits from a location of the access device and reach a location of a simulated UE. The processor may be configured to identify a ray that reaches a location of a simulated UE according to static object information of an area at where the access device is located and a location of a simulated mobile object, the ray is transmitted from a location of the access device. Moreover, the processor may be further configured to determine the prediction function parameter according to the identified ray and the location of the simulated UE. The access device further comprises a transmitter, and the transmitter is configured to transmit the prediction function parameter to the UE. The processor and the transmitter may be applied to implement the above possible implementations.

In a fourth aspect, a network node is provided. The network node comprises a processor. The processor is configured to perform a ray tracing simulation. At least one ray that reaches a location of a simulated UE is identified by the processor according to static object information of an area at where the access device is located and a location of a simulated mobile object, the ray is simulated to be transmitted from a location of the access device. Moreover, the processor may be further configured to determine the prediction function parameter according to the identified ray and the location of the simulated UE. The network node further comprises a network interface, and the network interface is configured to transmit the prediction function parameter to the access device. The processor and the network interface may be applied to implement the above possible implementations.

In a fifth aspect, an apparatus is provided. The apparatus comprises a non-transitory memory storing instructions; and one or more processors in communication with the non-transitory memory, wherein the one or more processors execute the instructions to perform the method according to the first aspect and above possible implementations. Optionally, the apparatus may comprise the UE, the access device or the network node as described above.

In a sixth aspect, a UE is provided. The user equipment comprises a processing unit and a transceiver unit. The processing unit is configured to determine at least one transmission path between the UE and an access device in accordance with a prediction function parameter, and a location of the UE and a location of at least one mobile object. The processing unit is further configured to determine a mm-wave beam according to the transmission path. The transceiver unit is configured to communicate with the access device via the mm-wave beam determined by the processing unit. The transceiver unit is further configured to receive the prediction function parameter from the access device. The processing unit and the transceiver unit may be applied to implement the above possible implementations.

In a seventh aspect, an access device is provided. The access device comprises a processing unit and a transceiver unit. The processing unit is configured to determine at least one transmission path between the access device and a UE in accordance with a prediction function parameter, and a location of the UE and a location of at least one mobile object. The processing unit is further configured to determine a mm-wave beam according to the transmission path. The processing unit may be further configured to perform a ray tracing simulation to identify a ray that transmits from a location of the access device and reach a location of a simulated UE. The mobile object information may be considered in the ray tracing simulation. The processing unit may be configured to identify a ray that reach a location of a simulated UE according to static object information of an area at where the access device is located and a location of a simulated mobile object, the ray is transmitted from a location of the access device. Moreover, the processing unit may be further configured to determine the prediction function parameter according to the identified ray and the location of the simulated UE.

Optionally, the access device may further comprise an interface unit, which is configured to receive the prediction function parameter from a network node.

The transceiver unit of the access device is configured to transmit the prediction function parameter to the UE. Optionally, the transceiver unit may be configured to receive the location information of UE, or the location information of the mobile object. The processing unit and the transceiver unit may be applied to implement the above possible implementations.

In an eighth aspect, a network node is provided. The network node comprises a processing unit and an interface unit. The processing unit is configured to perform a ray tracing simulation to identify a ray that transmits from a location of a access device and reach a location of a simulated UE. The processing unit may be configured to identify a ray that reach a location of a simulated UE according to static object information of an area at where the access device is located and a location of a simulated mobile object. Moreover, the processing unit may be further configured to determine the prediction function parameter according to the identified ray and the location of the simulated UE. For example, the processing unit may perform a machine learning to determine the prediction function parameter. The interface unit is configured to send the prediction function parameter to the access device. The processing unit and the interface unit may be applied to implement the above possible implementations.

In a ninth aspect, a mm-wave communication method is provided. A network device inputs a UE location into a beam prediction engine to generate a set of mm-wave beams, with the beam prediction engine generating the set of mm-wave beams based on at least one static object within a coverage area of an access device. The network device inputs at least one mobile object location of at least one mobile object into the beam prediction engine to select a subset of mm-wave beams from the set of mm-wave beams, with the beam prediction engine selecting the subset of mm-wave beams based on the at least one static object and the at least one mobile object. The network device selects at least one mm-wave beam from the subset of mm-wave beams.

In a possible implementation of the method according to the ninth aspect, the beam prediction engine is generated with respect to a static object location of the static object and at least one simulated mobile object location. Optionally, the beam prediction engine may be generated with respect to the static object location, the at least one simulated mobile object location, and at least one simulated UE location. The beam prediction engine may be generated with respect to at least one simulated UE location.

In a possible implementation of the methods according to the ninth aspect and the implementation above, the set of mm-wave beams is generated with respect to a static object location of the static object, at least one simulated mobile object location. Optionally, the set of mm-wave beams is generated with respect to the static object location, the at least one simulated mobile object location, and at least one simulated UE location. The set of mm-wave beams is generated with respect to at least one simulated UE location and the at least one static object within a coverage area of an access device.

In a possible implementation of the methods according to the ninth aspect and the implementation above, the network device comprises the access device, or a UE.

In a possible implementation of the methods according to the ninth aspect and the implementations above, the network device may select a transmit beam and/or a receive beam.

In a tenth aspect, a network device is provided. The network device comprises a non-transitory memory storing instructions; and one or more processors in communication with the non-transitory memory, wherein the one or more processors execute the instructions to perform the method according to the ninth aspect and corresponding possible implementations.

In a eleventh aspect, a non-transitory computer-readable media is provided. The non-transitory computer-readable media is configured to store computer instructions that when executed by one or more processors, cause the one or more processors to perform to the methods according to the first aspect, ninth aspect and above possible implementations.

In a twelfth aspect, a chipset system is provided. The chipset system includes at least one processor, used to implement the functionality of the above UE, the access device, or the network node. The chipset system may further includes a memory for storing program instructions and data. The chipset system may be comprised by chipsets, and may also be comprised by at least one of chipsets and other discrete device.

BRIEF DESCRIPTION OF DRAWINGS

For a more complete understanding of the present disclosure, and the advantages thereof, reference is now made to the following descriptions taken in conjunction with the accompanying drawing, in which.

DESCRIPTION OF EMBODIMENTS

The structure, manufacture and use of the presently embodiments are discussed in detail below. The specific embodiments discussed are merely illustrative of specific ways to make and use the disclosure, and do not limit the scope of the disclosure.

Figure 1:
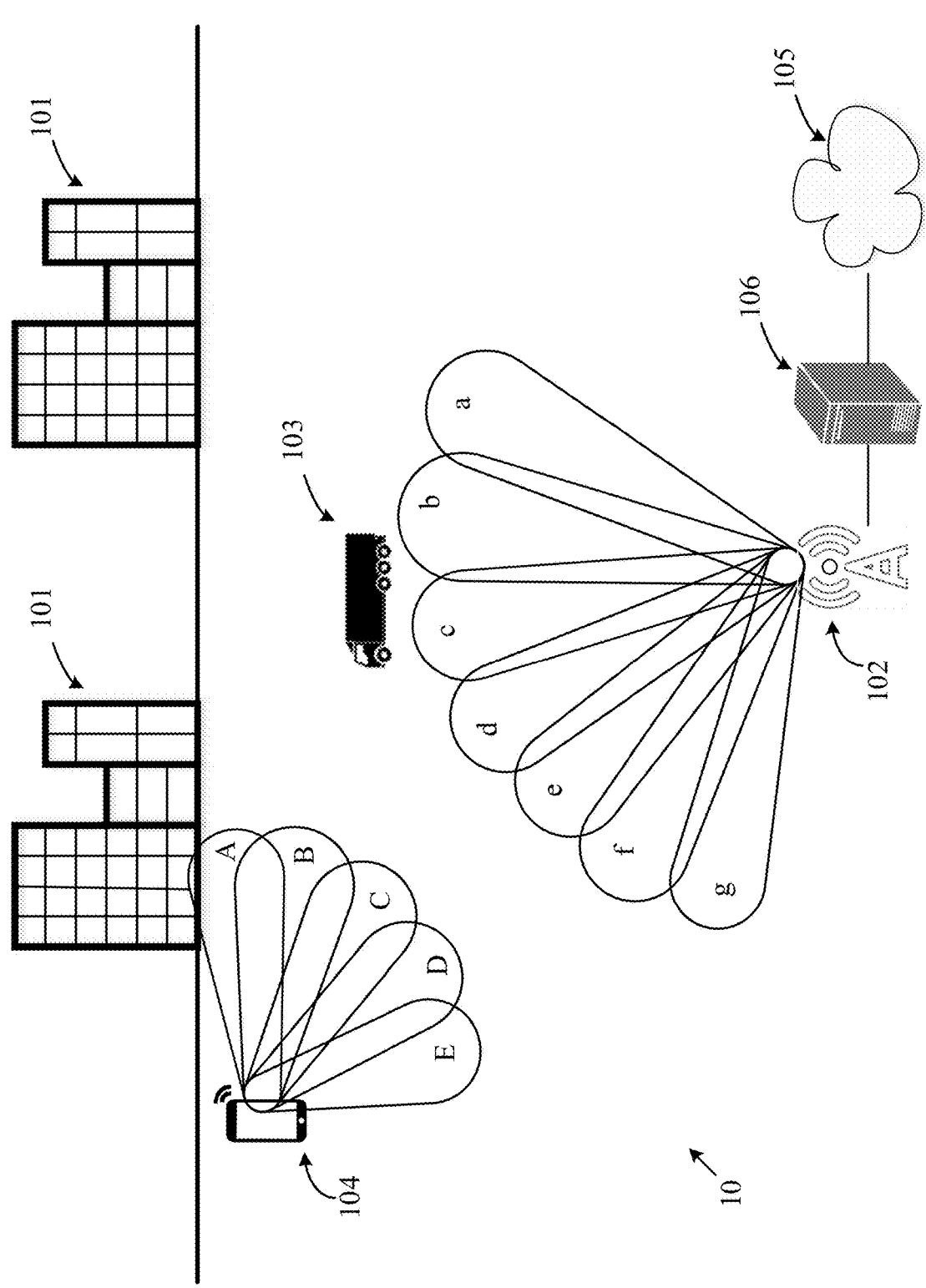
FIG. 1 illustrates a mm-wave communication system in an embodiment of the present disclosure.

FIG. 1 illustrates a mm-wave communication system 10 in an embodiment of the present disclosure. The system 10 includes at least one access device 102, and at least one user equipment (UE) 104. Within an area where the access device 102 is located, there may be a variety of obstacles or static objects 101, such as buildings, trees, signs, in an environment as shown in FIG. 1. There may also be at least one mobile object 103 in the area. The static objects 101 usually are fixed and relatively permanent. The mobile object 103 may be a vehicle, a pedestrian, and so on. The mobile object 103 may also be stationary at a specific time point or for a time period, such as a parked vehicle. The mobile object 103 may block or reflect propagation of mm-wave between the UE 104 and the access device 102. The mobile object 103 may be close to or in the vicinity of around the UE 104. The mobile object 103 may be at least partially blocking a line-of sight between the access device 102 and the UE 104, and therefore may block or interfere with mm-wave signals between the access device 102 and the UE 104. The distance between the mobile object 103 and the UE 104 may be less than a threshold, wherein the distance being less than the threshold indicates that the mobile object 103 is a potential interferer.

Both of the access device 102 and the UE 104 support mm-wave communication, namely, the access device 102 and the UE 104 can communicate with each other using mm-wave. The access device 102 and the UE 104 may use beam forming to communicate with each other. In an uplink communication between the access device 102 and the UE 104, the access device 102 is a receiving device and the UE 104 is a transmitting device. In a downlink communication, the access device 102 is a transmitting device and the UE 104 is a receiving device.

Because the access device 102 and the UE 104 employ beamforming, they can directionally receive and can directionally transmit. In a beamforming communication system, the access device 102 and the UE 104 may have a transmit beam pattern and a receive beam pattern. The beam pattern may also be called a radiation pattern or an antenna pattern. In embodiments of the present disclosure, "beam" may also be called a "mm-wave beam". The transmit beam pattern for a downlink communication comprises multiple transmit beams a-g at the access device 102. According to the beam pattern, the number of beams, the position of the beams, and/or the direction of the beams may be identified. The receive beam pattern at the UE 104 comprises antenna orientations for receiving specific, multiple incoming beam directions via beams A-E. For the access device 102, a selected transmit beam will be used for transmitting a signal in the downlink direction to the UE 104, while the receive beam at the UE 104 will be used for reception of an uplink signal from a particular direction/orientation. For the UE 104, the transmit beam is used for transmitting signal in uplink direction to the access device 102, while the receive beam is used to show reception of a downlink signal in a particular direction/orientation. For the access device 102 and for the UE 104, the receive beam pattern and the transmit beam pattern may be same, or may be different. The selected transmit and receive beams for an uplink communication from the access device 102 to the UE 104 may be the same as, or different from, the selected transmit and receive beams for a downlink communication. However, it should be understood that for a particular uplink or downlink communication, the transmit beam and the receive beam must be selected in a coordinated fashion so that a message sent on a selected transmit beam is received by the selected downlink beam.

For a mm-wave communication in a downlink direction from the access device 102 to the UE 104, a transmit beam of the access device 102 will need to be selected, and a corresponding suitable receive beam/antenna orientation will need to be determined for the UE 104. Likewise, for a communication in an uplink direction from the UE 104 to the access device 102, a transmit beam of the UE 104 will need to be selected, and a corresponding suitable receive beam/antenna orientation will need to be determined for the access device 102. It should be understood that a beam (or beam pair) selected for an uplink communication may be the same or different from a beam (or beam pair) selected for a corresponding downlink communication. Further, a selected beam path between the access device 102 and the UE 104 may comprise a direct, line-of-sight path, or may comprise an indirect path, wherein the mm-wave signal travels between the UE 104 and the access device 102 with at least some reflections.

As an example, the access device 102 has a beam pattern comprising seven potential beam/antenna orientations, i.e., such as beam a to g, as shown in FIG. 1. In the example shown in FIG. 1, the UE 104 has a beam/antenna pattern comprising five potential beam/antenna orientations, i.e., beams A to E. If an uplink communication is in progress, the beam pattern of the access device 102 is a receive beam pattern and the beam pattern of the UE 104 is a transmit beam pattern. If a downlink communication is in progress, the beam pattern of the access device 102 is a transmit beam pattern and the beam pattern of the UE 104 is a receive beam pattern. In a communication, the transmit beam/antenna orientation and the receive beam/antenna orientation may be called a beam pair.

The access device 102 may comprise a base station in a wireless cellular system. The access device 102 may possess cellular communication capability, such as second generation (2G), third generation (3G), fourth generation (4G), and/or fifth generation (5G) communication capability or capabilities. Besides cellular communication capability, the base station can further have mm-wave communication capability or mm-wave communication prediction functionality. In embodiments of the present disclosure, the base station may also be referred to as a mm-wave base station. In different wireless cellular systems, the base station may be, for example, one or more of a base transceiver station (BTS) in a 2G wireless cellular system, a Node B (NodeB) in a 3G wireless cellular system, an evolved Node B (eNB) in a long term evolution (LTE) system or a 4G wireless cellular system, a transmission reception point (TRP), a next generation Node B (gNB) in a 5G system, or an access apparatus in any subsequent wireless cellular system.

The access device 102 may also be a micro access device in a wireless cellular system. For example, the access device 102 may be an access point (AP), a relay node (RN), a home eNodeB, a pico-base station, or a femto base station. In examples of the present disclosure, these micro access devices can support mm-wave communication capability or mm-wave communication prediction functionality. The access device 102 may also be an access device in other systems, for example, a system defined by Institute of Electrical and Electronics Engineers (IEEE) protocols. The access device 102 may be any access device which can support mm-wave communication independently or can support both of mm-wave communication capability and any other radio access technology (RAT) communication capability.

In embodiments of the present disclosure, the UE 104 may comprise a terminal, a mobile station, a subscriber unit, a station, or a terminal equipment. The UE 104 may be a cellular phone, a personal digital assistant, a modem, or a pad/tablet device. The UE 104 may also support wireless cellular communication. For example, the UE 104 may communication with the access device 102 in 2G, 3G, LTE, or 5G system. With the development of communications technologies and Internet of Things (IOT), any device that can access a wireless network and communicate with network side, or communicate with other devices directly or indirectly, could be the UE 104 in embodiments of the present disclosure. For example, a vehicle in a smart transportation system, an appliance in a smart home, a power meter reader, a power voltage monitor in a smart grid, or a video monitor in smart security network, etc.

The system 10 may further comprise a node 106. The node 106 may connect to at least one access device 102. The node 106 may be adjacent to or remote from the access device 102. The node 106 may perform one or more prediction functionalities of the access device 102, which can alleviate the burden of the access device 102. For example, the node 106 may perform resource scheduling, or interference coordination, or perform computation functionality for the access device 102. Alternatively, or in addition, the node 106 can comprise a firewall, gateway router, or other network node that enables communications exchange with a network or networks 105. For example, the network 105 may be the Internet, but could be any manner of wireless and/or wired network.

Although FIG. 1 illustrates one example of a mm-wave communication system, various changes may be made to FIG. 1. The UE 104, and the node 106 in the system 10 are one example, and the embodiments disclosed herein are not limited to the system 10 illustrated in FIG. 1. For example, the system 10 could include any number of UEs 104, communication access devices 102, or other components in any suitable configuration such as core network elements, which are not shown in FIG. 1.

Figure 2:
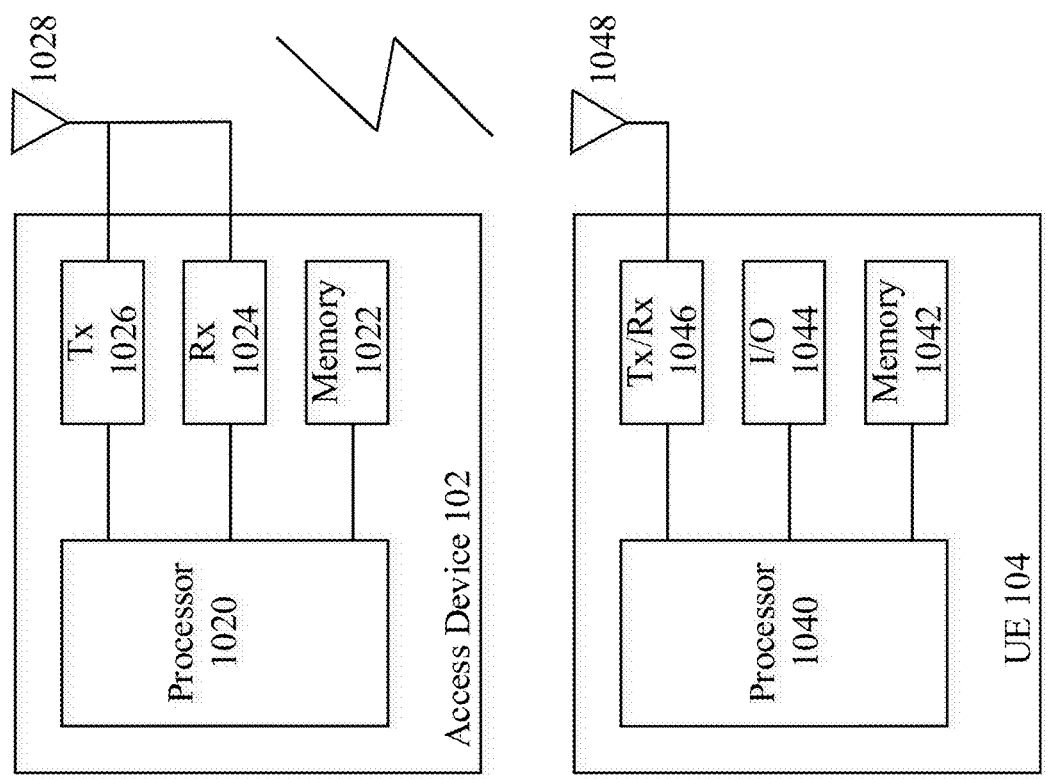
FIG. 2 comprises block diagrams of an access device and a UE in an embodiment.

FIG. 2 comprises block diagrams of the access device 102 and the UE 104 in an embodiment. As shown in FIG. 2, the access device 102 includes at least one processor 1020, at least one transmitter (Tx) 1026, at least one receiver (Rx) 1024, one or more antennas 1028, and at least one memory 1022. The processor 1020 implements various processing operations of the access device 102, such as signal coding, signal processing, power control, input or output processing, or any other prediction functionality. The processor 1020 can also support the methods and teachings described in more details described in embodiments of the present disclosure. Each processor includes any suitable processing or computing device configured to perform one or more operations. Each processor 1020 could, for example, include a microprocessor, microcontroller, digital signal processor, field programmable gate array, or application specific integrated circuit.

Each transmitter 1026 includes any suitable circuitry for generating signals for wireless transmission to one or more UEs or other devices. Each receiver 1024 includes any suitable circuitry for processing signals received wirelessly from one or more UEs or other devices. Although shown as separate components, the at least one transmitter 1026 and the at least one receiver 1024 could be combined into a transceiver. Each antenna 1028 includes any suitable structure for transmitting and/or receiving signals. While a common antenna 1028 is shown here as being coupled to both the transmitter 1026 and the receiver 1024, one or more antennas 1028 could be coupled to the at least one transmitter 1026, and one or more separate antennas 1028 could be coupled to the at least one receiver 1024. Each memory 1022 includes any suitable volatile and/or non-volatile storage and retrieval device(s).

The access device 102 may be configured to transmit and receive signals below 6 GHz (e.g., a microwave frequency range), as well as over a mm-wave frequency range (e.g., 6 GHz to 100 GHz). When transmitting or receiving over the mm-wave frequency range, the access device 102 may be configured to perform beam forming. For example, antenna 1028 may include a phased-array beam antenna.

The UE 104 includes at least one processor 1040. The processor 1040 implements various processing operations of the UE 104. For example, the processor 1040 could perform signal coding, signal processing, power control, input/output processing, or any other functionality enabling the UE 104 to operate in the system 10. The processor 1040 also supports the methods and teachings described in more detail herein. Each processor 1040 includes any suitable processing or computing device configured to perform one or more operations. Each processor 1040 could, for example, include a microprocessor, microcontroller, digital signal processor, field programmable gate array, or application specific integrated circuit.

The UE 104 also includes at least one transceiver 1046. The transceiver 1046 is configured to modulate signal or other content for transmission by at least one antenna 1048. The transceiver 1046 is also configured to demodulate signal or other content received by the at least one antenna 1048.

Each transceiver 1046 includes any suitable circuitry for generating signals for wireless transmission and/or processing signals received wirelessly. Each antenna 1048 includes any suitable structure for transmitting and/or receiving wireless signals. One or multiple transceivers 1046 could be used in the UE 104, and one or multiple antennas 1048 could be used in the UE 104. Although shown as a single prediction functional unit, a transceiver 1046 could also be implemented using at least one transmitter and at least one separate receiver.

The UE 104 may be configured to transmit and receive signals below 6 GHz (e.g., a microwave frequency range), as well as over mm-wave frequency range (e.g., 6 GHz to 100 GHz). When transmitting or receiving over the mm-wave frequency range, the UE 104 may be configured to perform beam forming. For example, antenna 1048 may include a phased-array beam antenna.

The UE 104 further includes one or more input/output devices 1044. The input/output devices 1044 facilitate interaction with a user. Each input/output device 1044 includes any suitable structure and/or circuitry for providing information to or receiving information from a user, such as a speaker, microphone, keypad, keyboard, display, or touch screen.

In addition, the UE 104 includes at least one memory 1042. The memory 1042 is non-transitory memory storage, in one embodiment. The memory 1042 stores instructions and signal used, generated, or collected by the UE 104. For example, the memory 1042 could store software or firmware instructions executed by the processing unit(s) 1040 and signal used to reduce or eliminate interference in incoming signals. Each memory 1042 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, or the like.

In embodiments of the present disclosure, the signal may comprise a control signal and/or data signal. Namely, the signal may carry control plane information and/or user plane information.

Figure 3:
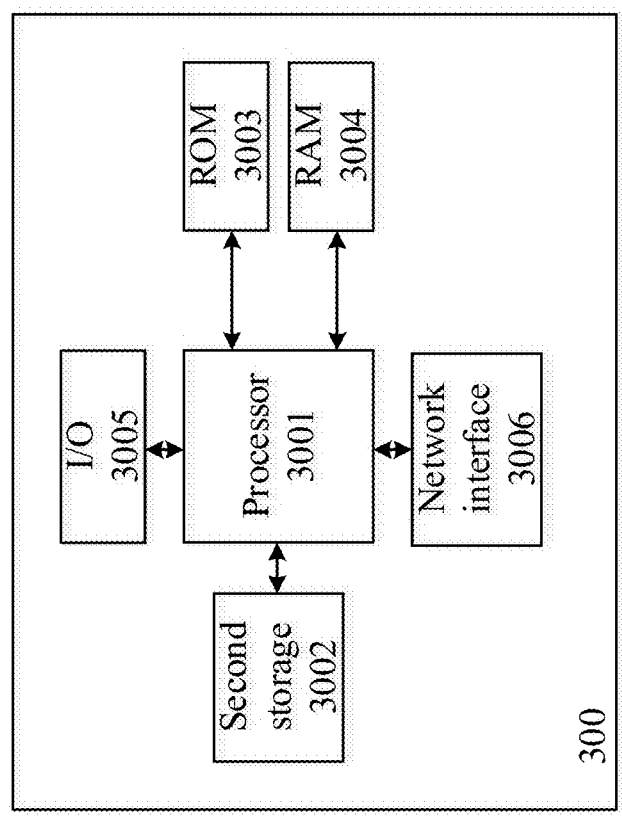
FIG. 3 is a block diagram of a network component in an embodiment.

FIG. 3 is a diagram of a general-purpose network component 300 in accordance with an embodiment of the present disclosure. As an option, the network component 300 may be implemented in the context of any devices of the system 10, for example, the access device 102, the UE 104, or the node 106. However, it is to be appreciated that the network component 300 may be implemented in any desired environment. The network component 300 includes a processor 3001 that is in communication with memory devices including secondary storage 3002, and memory, such as ROM 3003 and RAM 3004, input/output (I/O) devices 3005, and a network interface 3006. Although illustrated as a single processor, the processor 3001 is not so limited and may comprise multiple processors. The processor 3001 may be implemented as one or more CPU chips, cores (e.g., a multi-core processor), FPGAs, ASICs, and/or DSPs, and/or may be part of one or more ASICs.

The secondary storage 3002 is typically comprised of one or more disk drives or tape drives and is used for non-volatile storage of signal and as an over-flow signal storage device if the RAM 3004 is not large enough to hold all working signal. The secondary storage 3002 may store programs/instructions that are loaded into the RAM 3004 when such programs are selected for execution. The ROM 3003 is used to store instructions and perhaps signals that are read during program execution. The RAM 3004 can be used to store signals and perhaps to store instructions. Access to both the ROM 3003 and the RAM 3004 is typically faster than to the secondary storage 3002. Computer programs or instructions may be stored in the secondary storage 3002, the ROM 3003, and/or the RAM 3004. In one embodiment, the processor 3001 may execute instructions in the secondary storage 3002, the ROM 3003, or the RAM 3004 to implement an of the functionality set forth in connection with the access device 102, the UE 104, or the node 106.

A mm-wave communication between the UE 104 and the access device 102 may be partially or fully blocked by an object, either a mobile object 103 or a static object 101. For example, if a vehicle moves into a position between the UE 104 and the access device 102, the mm-wave communication between the UE 104 and the access device 102 may be interrupted. Particularly, for mm-wave communication using a narrow beam, the mobility of the UE 104 causes beam switching to be performed more frequently, and the mm-wave communication will be negatively influenced by more mobile objects 103. Therefore, it is important to carefully select a mm-wave beam or beam pair for use in communications. Corrected beam selection makes the mm-wave communication more successful and the use of system resources will be more economical.

In embodiments of the present disclosure, a network device, such as the access device 102 or the UE 104, may select a mm-wave beam suitable for mm-wave communication according to a UE location and at least one mobile object location of at least one mobile object. In one example, the network device may use the UE location and at least one static object location to generate a set of mm-wave beams. Furthermore, the network device may use the at least one mobile object location along with the at least one static object location and the at least one mobile object location to select a subset of mm-wave beams from the set of mm-wave beams. The network device may select one or more beams for mm-wave communication from the subset of mm-wave beams. According to such embodiments, the network device does not need to search all beams one by one to determine a mm-wave beam that is suitable for mm-wave communication. Moreover, since the beam selection takes the mobile object into consideration, the mm-wave communication between the access device 102 and the UE 104 have less possibility of being degraded or interrupted by the mobile object.

In one embodiment, a network device may input the UE location into a beam prediction engine to generate a set of mm-wave beams. The beam prediction engine generates a set of mm-wave beams based on at least one static object known to be in the general area or region of the access point 102. The network device inputs a location of at least one mobile object into the beam prediction engine to select a subset of mm-wave beams from the set of mm-wave beams, with the beam prediction engine selecting the subset of mm-wave beams based on the at least one static object and the at least one mobile object. The network device selects a mm-wave beam from the subset of mm-wave beams.

In an example, the beam prediction engine can be used to determine possible beams that are suitable for mm-wave communication. The beam prediction engine may be a software component, a hardware component, or a mix thereof. The beam prediction engine may execute a prediction function, a mathematical algorithm, or a formula. The beam prediction engine may be generated according to a static object location of at least one static object, at least one simulated mobile object location, and at least one simulated UE location. Optionally, the beam prediction engine may be generated according to a machine learning combined with a ray tracing simulation.

Embodiments of the present disclosure determine in advance an available or possible transmission path between the UE 104 and the access device 102, including transmission/reception beam pairs. The embodiments determine beams for mm-wave communication according to the transmission path, and then the UE 104 and the access device 102 may communicate with each other via the determined beams.

The transmission path is a trajectory or path that may be potentially used for a mm-wave transmission between the UE 104 and the access device 102. The transmission path may also be referred to as a mm-wave transmission path in embodiments of the present disclosure. The transmission path is desirably selected so that no object blocks or interferes with mm-wave transmission on such path. Because the mm-wave may propagate similar to light rays, the transmission path can be selected as a line-of-sight path or indirect path. Determining the transmission path in advance means predicting or estimating the transmission path for subsequent possible use.

In the embodiment of the present disclosure, beams may be determined according to a predicted transmission path. Thus, it is not necessary to search all of the beams of the UE 104 and the access device 102, one by one, in order to determine the beams for mm-wave communication. This can reduce mm-wave beam acquisition time and can minimize overhead that would result from an exhaustive one-by-one beam search, where the performance or suitability of each possible beam would be used, measured, or otherwise tested for use.

In embodiments of the present disclosure, a light ray can be simulated between the UE 104 and the access device 102 to determine a transmission path between the UE 104 and the access device 102 in advance. Namely, if a predicted/simulated ray exists that can be transmitted from a location of the access device 102 to a location of the UE 104, then a transmission path is available between the access device 102 and the UE 104. Therefore, ray tracing technology may be applied to determine whether there is transmission path between the access device 102 and the UE 104. If a ray can be transmitted between the UE 104 and the access device 102, then the ray can be transmitted between a location of the UE 104 and a location of the access device 102.

Ray tracing is a method for identifying transmission paths from a source to one or more destinations. A transmission path may be identified by simulating a ray originating from a source and following propagation, reflections, or refractions as required by the simulated geometrical layout of a neighborhood in which the source is present. If a simulated ray reaches a destination of interest in the simulated environment, such the ray may represent a transmission path from the source to the destination in the physical environment.

A ray tracing technology may be used to detect transmission of rays from a light source in different directions to see how many rays (and/or which rays) can reach a specific receiver or destination. If there are rays that may reach the receiver, it demonstrates that a transmission path is available between the light source and the receiver or destination. In the embodiments of the present disclosure, a light source may be set at a location of the access device 102, and rays from the light source are transmitted in all directions. Concurrently, a ray receiver may be set at a location of the UE 104 to detect how many (and/or which rays) reach the location of the UE 104. To improve the efficiency of determining the transmission path and to save cost, in the embodiments of the present disclosure, the determining of or identifying rays that are transmitted from the location of the access device 102 and that can reach the location of the UE 104 may be realized, instead of tracing real rays. For simplicity of description, the ray transmitted from the location of the access device 102 and can reach the location of the UE 104 may be described as the determined ray or identified ray.

To implement determining or identifying rays that are transmitted from the location of the access device 102 and can reach the location of the UE 104 without tracing real rays, in embodiments of the present disclosure, a prediction function is used to determine the identified or predicted ray. The prediction function may be determined based on machine learning or machine training. The machine learning of the prediction function is based on multiple tracing of rays transmitted from the access device 102. The UE 104 may determine or predict the identified rays according to the prediction function. The prediction function also is known as a ray prediction function. Alternatively, the beam prediction engine may comprise the prediction function referred in embodiments of the present disclosure.

The tracing of rays transmitted from a location of the access device 102 may be performed in a ray tracing simulation. A network node can simulate tracing of rays sent from the location of the access device 102 and identify which rays can reach different locations in the area of the access device 102. Accordingly, a tracing result is obtained, including information about the identified ray and information of at least one location where the ray can reach. The network node can further use the tracing result to determine the prediction function. After the prediction function is determined, parameters of the prediction function may be transmitted to the UE 104 so the UE 104 can determine the transmission path between the access device 102 and the UE 104, i.e., predict or estimate the identified rays.

In the ray tracing simulation, at least one mobile object is taken into consideration, along with features and obstacles that are present in a real environment. The ray tracing simulation can determine the rays and transmission paths suitable for practical scenarios.

In an example, the ray tracing simulation and the prediction function determination may be performed at the access device 102, or may also be performed at the node 106 if the node 106 is included in the system 10. The node 106 can transmit the determined prediction function parameters to the access device 102. The access device 102 may transmit the prediction function parameters to the UE 104. In the example, when the network component 300 is implemented in the context of the node 106, the processor 3001 may perform the ray tracing simulation and the prediction function determination. The network interface 3006 may transmit the prediction function parameters to the access device 102. Alternatively, the ray tracing simulation and the prediction function determination may also be performed at any other node or software platform in the system 10.

Figure 4:
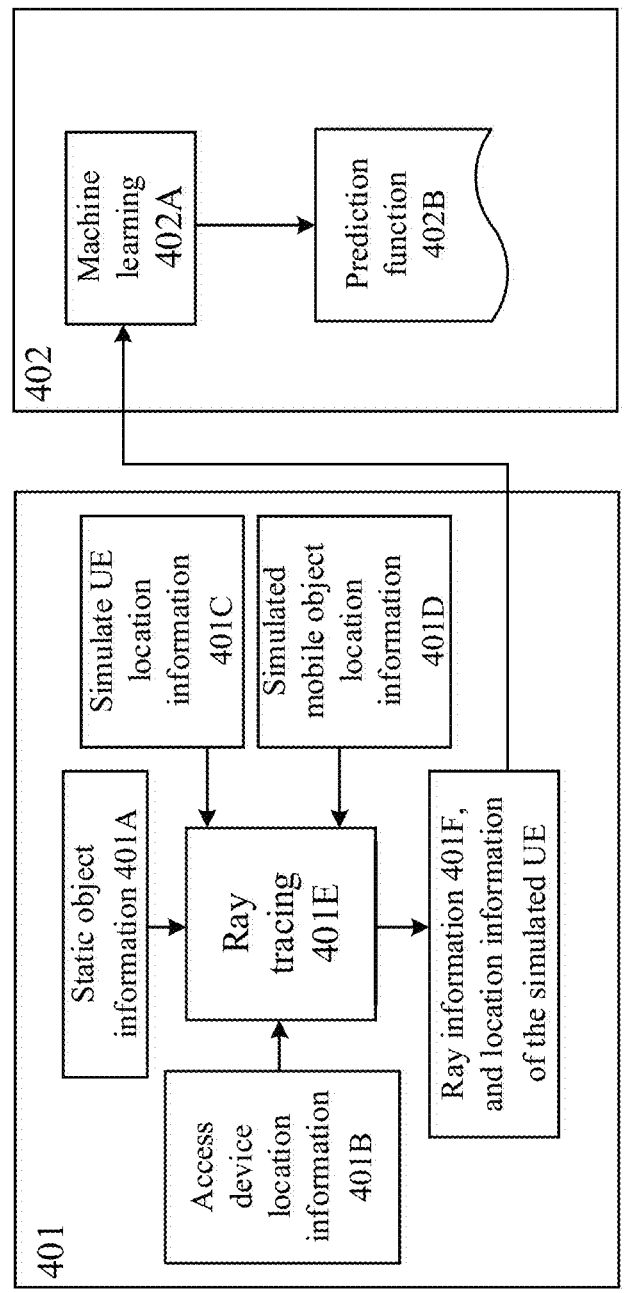
FIG. 4 is a flowchart of a ray tracing simulation and a corresponding prediction function determination.

FIG. 4 shows an embodiment of a ray tracing simulation and a prediction function determination. As mentioned above, the ray tracing simulation and the prediction function determination may be performed by the access device 102, by the node 106, or by another node or network element in the system 10. The ray tracing simulation and the prediction function determination may be performed by a same node or network entity, or may be performed by different nodes or network entities. Where the ray tracing simulation and the prediction function determination are performed by different nodes or network entities, the simulation results of the ray tracing simulation may be transmitted from a node where the simulation is performed to a node performing the prediction function determination.

In operation 401, a ray tracing simulation is performed. Static object information 401A is provided for the ray tracing simulation. The static objects may be buildings, streets, etc., or other stationary objects that can influence ray propagation. The static object information 401A may be two dimensional (2D) or three dimensional (3D) geographical information, or 2D or 3D map. The 2D geographical information may comprise coordinates of objects represented in the two horizontal axes. The 3D geographical information may comprises coordinates of objects represented in the two horizontal axes and the vertical axis. The 2D or 3D geographical information, or 2D or 3D map may include geographical information of building, streets, or trees or any other stationary objects. The static object information 401A could be preset on a network node which is to perform the ray tracing simulation, for example, the access device 102, or the node 106. Alternatively, the network node which is to perform the ray tracing simulation may also obtain the static object information 401A from other nodes. The static object information 401A may be updated periodically. The update period dependents on changes in the static objects. Due to static objects usually not changing frequently, the update period may be, for example, months.

The static object information 401A may be information of static objects in the area or volume of the access device 102, i.e., the area or volume where the access device 102 is located. For example, the area may be a coverage area of the access device 102, or may be an area broader than and comprise the coverage area of the access device 102. Or the area may be miles or tens of miles around, or may depend on how far a mm-wave sent from the access device 102 can be received.

At least one UE 104 and at least one mobile object 103 are located in the area of the access device 102 in a simulation environment of the ray tracing simulation. In the ray tracing simulation, at least one mobile object 103 may be placed randomly in the area of the access device 102. Mobile objects, such as vehicles, may serve as mobile reflectors or diffraction objects of rays. A real street has such vehicles, and they can have a significant influence on which transmission paths are usable. Consequently, identification of a ray that is blocked by vehicles at a certain location in the simulation indicates that the corresponding transmission path may be blocked in the physical world if a vehicle is present at the location. Therefore, it is advantageous to consider mobile objects in ray tracing simulation. Particularly, in scenarios requiring low latency, for example, in 5G system, the solutions provided by the embodiments of the present disclosure improve accuracy and decrease latency.

The at least one UE 104 and the at least one mobile object 103 are simulated within the 3D map in the simulation environment.

Besides the static object information 401A, location information 401B of the access device 102, location information 401C of the at least one UE 104, and location information 401D of the at least one mobile object 103 are provided in the ray tracing simulation.

Figure 5:
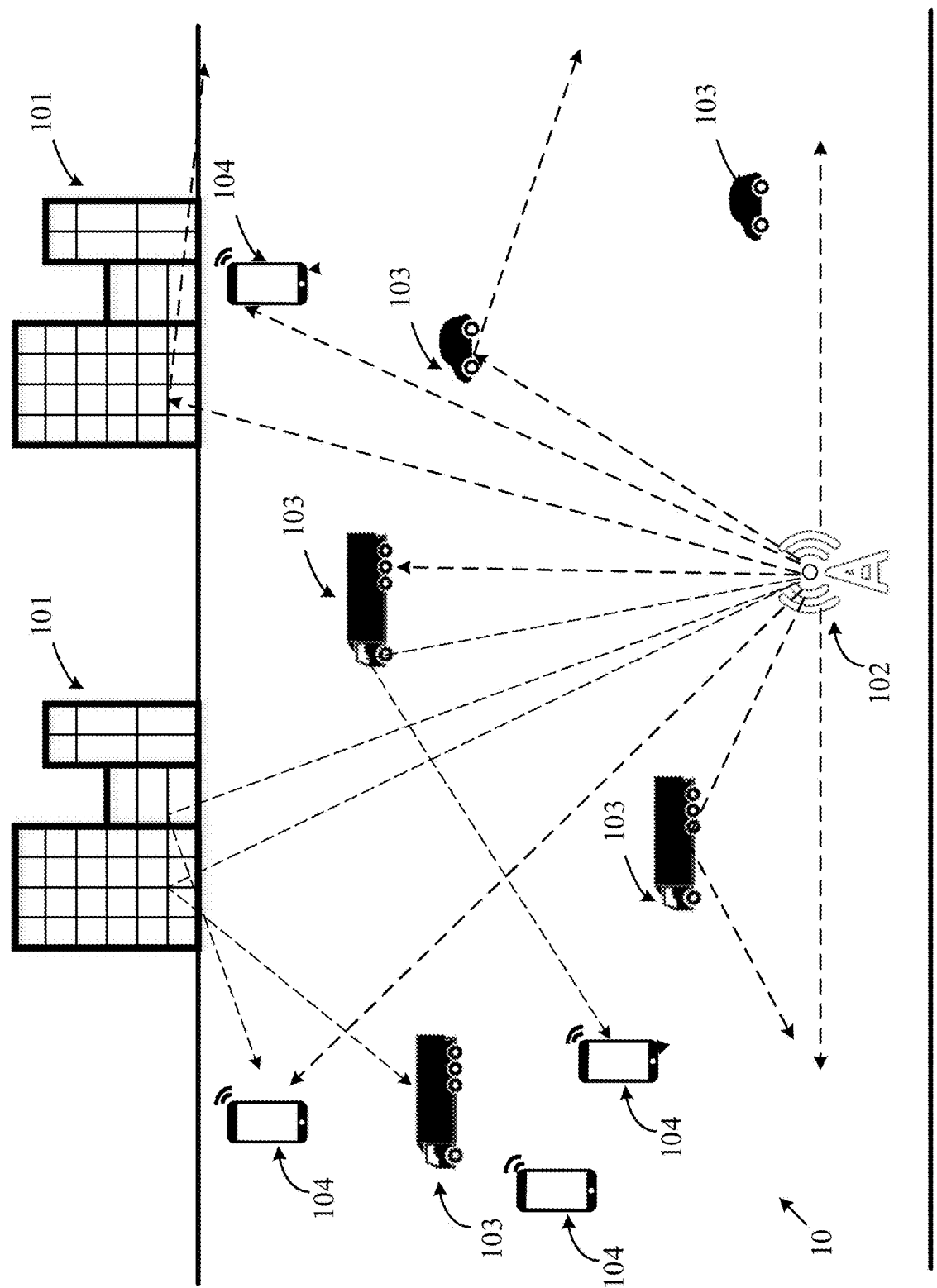
FIG. 5 is a ray tracing simulation in an embodiment.

As an example, a simulated scenario 10 as shown in FIG. 5 may be configured virtually in a software run in the access device 102, or the node 106 or other node. The 3D map demonstrates geographical information of static objects 101 in a real area of the access device 102. In the simulated scenario, multiple simulated mobile objects 103, i.e., multiple the trucks and cars and multiple simulated UEs 104 can be randomly placed in the area. Location information of each of the mobile objects 103 and the simulated UEs 104 may be obtained in the 3D map. Omnidirectional rays are simulated to be transmitted from the location of the access device 102.

The location information 401B of the access device 102 may include geographical location information of the access device 102, for example, latitude and longitude coordinates. It could be obtained by the access device 102 through a positioning technology, such as a global satellite positioning technology or network based positioning techniques (e.g., time difference of arrival, forward link trilateration, signal strength based ranging), and other positioning technologies. The geographical position information of the access device 102 also could be pre-stored in the access device 102 when the access device 102 is deployed.

The location information 401B of the access device 102 may further include height information or altitude information of the access device 102. To ensure a signal can be transmitted as far as possible and avoid any blockage, the access device 102 may be deployed at a high or elevated position. The height of the access device 102 may affect propagation of signal transmitted from the access device 102. Therefore, by considering the height information of the access device 102 in the ray tracing simulation, it can make the prediction of the mm-wave transmission path more accurate. The height information or altitude information of the access device 102 may be pre-stored in the access device 102 when the access device 102 is deployed.

A ray tracing 401E is performed at each location of the at least one UE 104 in the ray tracing simulation. The ray tracing 401E comprises simulating the transmission of a narrow beam of radiation (such as light or laser) in multiple different directions. Due to the static objects 101 and the at least one mobile object 103 in the simulation, some rays may be blocked and cannot reach any UE 104. Some rays may reach the at least one UE 104 directly without any blockage, reflection and diffraction. Some rays may reach the at least one UE 104 by reflection off of static and/or mobile objects. Therefore, at least one ray between the access device 102 and the UE 104 may be identified in accordance with the location information 401A of any static objects 101, the location information 401B of the access device 102, the location information 401C of the UE 104, and the location information 401D of any mobile objects 103.

Optionally, the ray tracing simulation can include effects caused by properties of materials of the static and mobile objects. For example, if the simulated environment consists of concrete buildings, the reflection and refraction properties of concrete can be used. Specifically, reflection and refraction coefficients for concrete can be incorporated into the simulation. The simulation can also include computation of attenuation of the energy in the ray. The properties of the materials can significantly impact the results of the simulation. For example, concrete typically has a lower reflection coefficient than glass. Thus, a ray reflected off a concrete building may suffer a higher attenuation of signal than a ray reflected off a glass surface. Consequently, a ray reflected off a concrete building may be considered too weak to identify a corresponding transmission path.

According to the ray tracing 401E at the at least one simulated UE 104, at least one identified ray information 401F is determined. The identified ray information of 401F may include an angle of arrival (AoA) and an angle of departure (AoD) for each identified ray that can reach the at least one UE 104.

In operation 402, as illustrated in FIG. 4, a prediction function 402B is determined.

The identified ray information 401F obtained from operation 401, and location information of a simulated UE 104 where the identified ray reaches, may be used to determine the prediction function, i.e., the prediction function described above. The prediction function gives, for a UE 104 at a given location and for each ray from the access device 102, an indication of whether the ray reaches the UE and the AoA of the ray at the UE if the ray reaches the UE. Alternatively, the prediction function, given a location of a UE, and optionally a location of neighboring mobile object, can provide a ray that reach the UE. There can also be more than one prediction function, and the UE and access device can select from the more than one prediction function based on a predetermined criteria. For example, multiple prediction functions can be generated to reflect different vehicular traffic densities at different times of the day (i.e., mobile objects can be placed with different densities for generation of the different prediction functions) and the UE and the access device 102 can select the prediction function based on the time of the day.

The prediction function 402B may be determined according to machine learning or machine training 402A. The machine learning 402A of the prediction function is based on multiple tracing of rays transmitted from the access device 102. Different machine learning methods may be used for determining the prediction function 402B, for example, support vector machine (SVM), neural network, random forest, and so on.

In an example, the prediction function 402B may be a polynomial function. For example, according to the machine learning procedure, a polynomial function of order n: $AX^n + BX^{n-1} + \ldots CX$ is an appropriate prediction function, where order n, matrices A, B, C, ... are coefficients that are learned according to machine learning 402A, and where X represents vector of inputs. The order n is determined during the machine learning 402A. The n may be an integer that is equals to or larger than 1. A higher order n polynomial may capture more complex relationship. Taking the example of function of one input variable, a linear function is generated if n=1. Namely, the function can be represented as a straight line. A parabola may be generated if n=1. Alternatively, the prediction function can comprise a computation graph consisting of multiple nodes and coefficients, wherein each node defines a computation and computations in nodes can take as inputs computation results of other nodes.

The prediction function 402B may be updated if there are new ray tracing results. Alternatively, new prediction function may be determined according to new ray tracing results generated in the ray tracing simulation.

In embodiments of the present disclosure, after the prediction function is determined, a prediction function parameter may be transmitted to the UE 104 to allow the UE 104 to determine the identified ray. The prediction function parameter may refer to a coefficient or a structure of the prediction function. For example, in the example of a polynomial function of order n: $AX^n + BX^{n-1} + \ldots CX$, the prediction function parameters comprise the order of the polynomial (n), coefficients, A, B, C, etc.

In an example, if the UE 104 and the access device 102 can support wireless cellular communication, for example, LTE or 5G communication, and the UE 104 and the access device 102 establish the communication between them, the access device 102 may transmit prediction function parameters to the UE via the wireless cellular communication. Alternatively, the access device 102 may broadcast the prediction function parameters in a broadcast channel of the mm-wave communication system, namely, the prediction function parameters may be transmitted in broadcast system information. The UE 104 may acquire the broadcast system information. If there is any update of the prediction function parameters, the UE 104 can also obtain the updated prediction function parameters by periodically acquiring the broadcast system inform.

In examples, if the access device 102 determines the prediction function, the access device 102 transmits the prediction function parameters to the UE 104. However, if the node 106 or other node in the system 10 determines the prediction function, the prediction function parameters may be transmitted to the access device 102, and the access device 102 relays the prediction function parameters to the UE 104.

Additionally, the transmit beam pattern and the receive beam pattern of the access device 102 may also be transmitted to the UE 104. The UE 104 may also send a transmit beam pattern and a receive beam pattern of the UE 104 to the access device 102.

The UE 104 and the access device 102 may determine the identified ray according to the prediction function parameters. According to the prediction function parameters, the access device 102 does not need to transmit real rays. The identification of rays that are predicted to reach the location of the UE 104 may also be called a prediction of ray or an estimation of ray. If it is determined that there is at least one ray determined to be able to be transmitted from the location of the access device 102 to the location of the UE 104, it means that the trajectory or path of the identified ray is available for transmitting mm-wave communications. Therefore, the transmission path can then be determined by the access device 102 and the UE 104.

For the UE 104 at any location, both of the UE 104 and the access device 102 may determine one or more transmission paths. The UE 104 may determine the transmission path in accordance with the prediction function parameters. Similarly, the access device 102 may determine the transmission path in accordance with the prediction function parameters. Alternatively, it could be the access device 102, the node 106, or any other node in the system 10 that determines the transmission path in accordance with the prediction function parameters, and then indicates information of the transmission path to the UE 104.

In examples, the UE 104 and the access device 102 may determine the transmission path according to the prediction function parameters, the location information of the UE 104, and location information of at least one mobile object 103 around the UE 104.

The location information of the UE 104 may be determined by various positioning technologies, such as global satellite positioning technology or network based positioning techniques (e.g., time difference of arrival, forward link trilateration, signal strength based ranging), or other positioning techniques. When the UE 104 is moving, the UE 104 may obtain location information of a potential location that the UE 104 will be at. The UE 104 may determine the potential location according to the current location, movement velocity, movement direction, and duration of motion moving time.

The location information of the neighboring mobile object 103 may be provided from the network side to the UE 104, for example, from the access device 102 to the UE 104 in a dedicated link or in a broadcast channel. The location information of the neighboring mobile object 103 may be obtained by the mobile object 103 itself and be reported to the access device 102. Or, the access device 102 may obtain the location information using radar ranging or network based positioning techniques, for example.

The location information of a specific mobile object 103 may be periodically provided to the UE 104. Alternatively, there may not be a need to provide the location information of the mobile object 103 to the UE 104 very frequently, and such location information can be provided intermittently or as needed. As long as information such as moving velocity and moving direction of the mobile object 103 are provided to the UE 104 along with a timestamp, new locations can be estimated by the UE 104.

Alternatively, the UE 104 may obtain the location information of the mobile object 103 according to communication with the mobile object 103, for example, vehicle to vehicle (V2V) communication or device to device (D2D) communication.

In an example, the location information of the UE 104 and of the mobile object 103 may comprise latitude and longitude coordinate information. Optionally, the location information of the UE 104 and of the mobile object may further include height information or altitude information of the UE 104 and height information or altitude information of the mobile object 103, respectively.

The UE 104 may transmit the location information of the UE 104 (and the location information of the mobile object 103) to the access device 102. The access device 102 may use the location information of the UE 104 and the location information of the mobile object 103 to obtain the rays that can reach the location of the UE 104. The location information of UE 104 may be provided to the access device 102 periodically. Alternatively, there is no need to periodically provide the location information of the mobile object 103 to the access device 102. As long as information such as a moving velocity and a moving direction of the UE 104 are provided to the access device 102 along with a timestamp, a new location of the UE 104 may be estimated by the access device 102.

In an example, the prediction function may be a polynomial function of the location coordinates of an UE and location coordinates of the mobile objects 103.

$$F([x_r, y_r, x_{v1}, y_{v1}, \ldots, x_{vi}, y_{vi}]) = AX^n + BX^{n-1} + \ldots CX \quad (1)$$

where $x^n = [x_r, y_r, x_1, y_1, \ldots, x_{vi}, y_{vi}]$, $(x_r, y_r)$ are the coordinates of the UE and $x_r, y_r, x_1, y_1, \ldots, x_{vi}, y_{vi}$ are coordinates of the neighboring mobile objects. Matrices A, B, C, ... are matrices of coefficients. The vi means there are i neighboring mobile objects. The i may be an integer that is equal to or larger than 1.

By inputting the coordinate information of the UE 104 and the coordinate information of at least one mobile object 103, then at least one ray that is transmitted from the location of the access device 102 and that can reach at the location of the UE 104 can then be identified.

For example, if the UE 104 is located at $(x_r, y_r)$ and neighboring mobile objects are located at $(x_i, y_i)$, the prediction function F outputs the rays that are received at the UE 104. For example, the output of F may be a N×1 vector, where N is the number of rays. The $r^{th}$ element of the output indicates whether the $r^{th}$ ray from the access device 102 reaches the UE 104. The r is equal to or smaller than N. Alternatively, the prediction function F outputs for each ray the probability that it is received at the UE 104.

Optionally, in an example, to limit the computational complexity, a limited number of neighboring mobile objects 103 are considered, for example, the nearest K mobile objects 103. The K is an integer and may be determined according to the computation performance of the UE 104 and the access device 102, or the number of mobile objects 103 in the area, or the network transmission status, and so on. Alternatively, the mobile objects 103 to be considered are within a threshold distance from the UE 104, or must be within a threshold distance and be approximately between the UE 104 and the access device 102.

Alternatively, in another embodiment of the present disclosure, F may be a more complex prediction function of coordinates. Additional parameters such as height of the mobile object 103 and height of UE 104 may be included. That is, the determining the prediction function by machine learning may further include determining the prediction function using the additional parameters. In such a case the prediction function takes additional input parameters, for example $(h_{UE}, h_{v1}, \ldots, h_{vi})$, where $h_{UE}$ represents the height of the UE and $h_{vi}, \ldots, h_{v1}$ represent the heights of vehicles v1 ... vi.

Both the UE 104 and the access device 102 may determine the ray that can be transmitted from the access device 102 and that can reach the UE 104 according to the above embodiments of the present disclosure. Namely, the UE 104 and the access device 102 may determine the available transmission path.

To realize mm-wave communication, the UE 104 and the access device 102 may determine mm-wave beams for mm-wave communication between the access device 102 and the UE 104 based on at least one transmission path. According to technical solutions provided by the embodiments of the present disclosure, no matter where the UE 104 is or where the UE 104 moves, it is easy and convenient to determine only the possible the mm-wave beams for mm-wave communication instead of searching all beams one by one. The overhead of transmitting signals for selecting beams can also be reduced and the time spent in determining the beam to select is reduced.

In mm-wave communication, in an uplink transmission, the UE 104 may determine a transmit beam of the UE 104 for transmitting uplink signal. Since the UE 104 comprises a transmitting device in the uplink transmission, the UE 104 needs to consume more power and energy to transmit a signal than in receiving a signal. The UE 104 can save power by identifying the right beam to use for transmitting. Alternatively, the UE 104 may also determine more than one transmit beam for transmitting an uplink signal. Using more than one uplink transmit mm-wave beam, the UE 104 can improve accuracy and efficiency of transmission in situations where there are multiple transmission paths.

In the uplink transmission, the access device 102 as the receiving device does not need to use much energy. Thus, the access device 102 may determine more than one receive beam of the access device 102. Alternatively, the access device 102 may determine only one receive beam.

In a downlink transmission, the access device 102 comprises the transmitting device and may determine a downlink transmit beam. Like the UE 104 in the uplink transmission, the access device 102 may determine only one transmit beam to use in order to reduce energy consumption. Alternatively, the access device 102 may determine more than one transmit beam for the downlink transmission, to improve transmission efficiency.

In the downlink transmission, the UE 104, as the receiving device, may determine more than one receive beam. Alternatively, the UE 104 may determine only one receive beam.

In embodiments of the present disclosure, the UE 104 and the access device 102 may determine beams to be used for communication according to different considerations. As an example, the beams may be determined in accordance with a number of at least one transmission path in a same beam.

Figure 6:
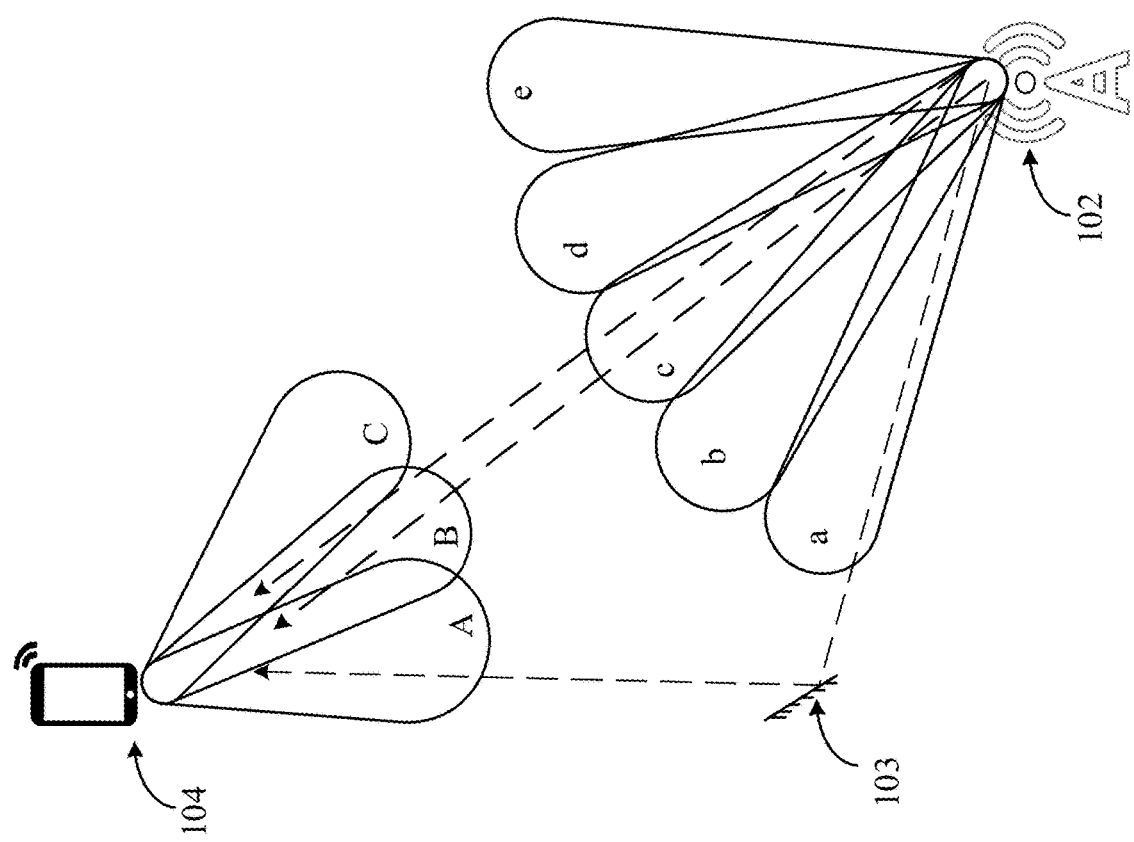
FIG. 6 is a diagram of beam determination in an embodiment.

FIG. 6 is a diagram of beam determination in an embodiment. Taking FIG. 6 as an example, the UE 104 has three beams A, B, and C, and the access device 105 has five beams a, b, c, d, and e. The identified transmission paths are mapped to beams as shown in FIG. 6. For the UE 104, one transmission path maps to the beam A, and two transmission paths map to the beam B. No transmission path is identified to be mapped to the beam C. According to the number of the transmission paths in the different beams, the beam B comprise the largest number of transmission paths. Therefore, the beam B may be determined as the beam of the UE 104 that is most suitable for mm-wave communication.

Alternatively, the beams suitable for the mm-wave communication may be determined in accordance with at least one of path length of the transmission path, a number of reflections and/or refractions in the transmission path, or the position of the transmission path in the beam pattern. The beam covering a transmission path with a longer path length, the beam covering a transmission path having a smaller number of reflections and/or refractions, or the beam covering a transmission path closer to the center of the beam pattern may be selected for the mm-wave communication.

Figure 7A:
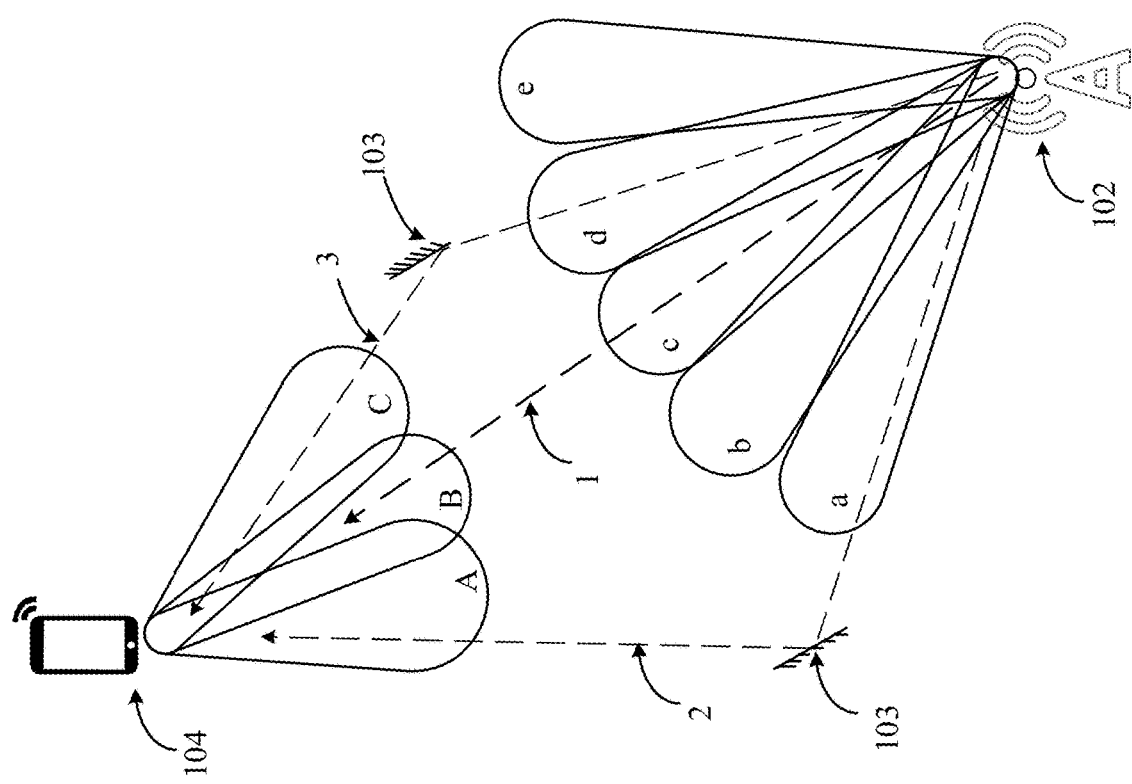
FIGS. 7A-7C illustrate schematic diagrams of determining a beam in an embodiment.
Figure 7B:
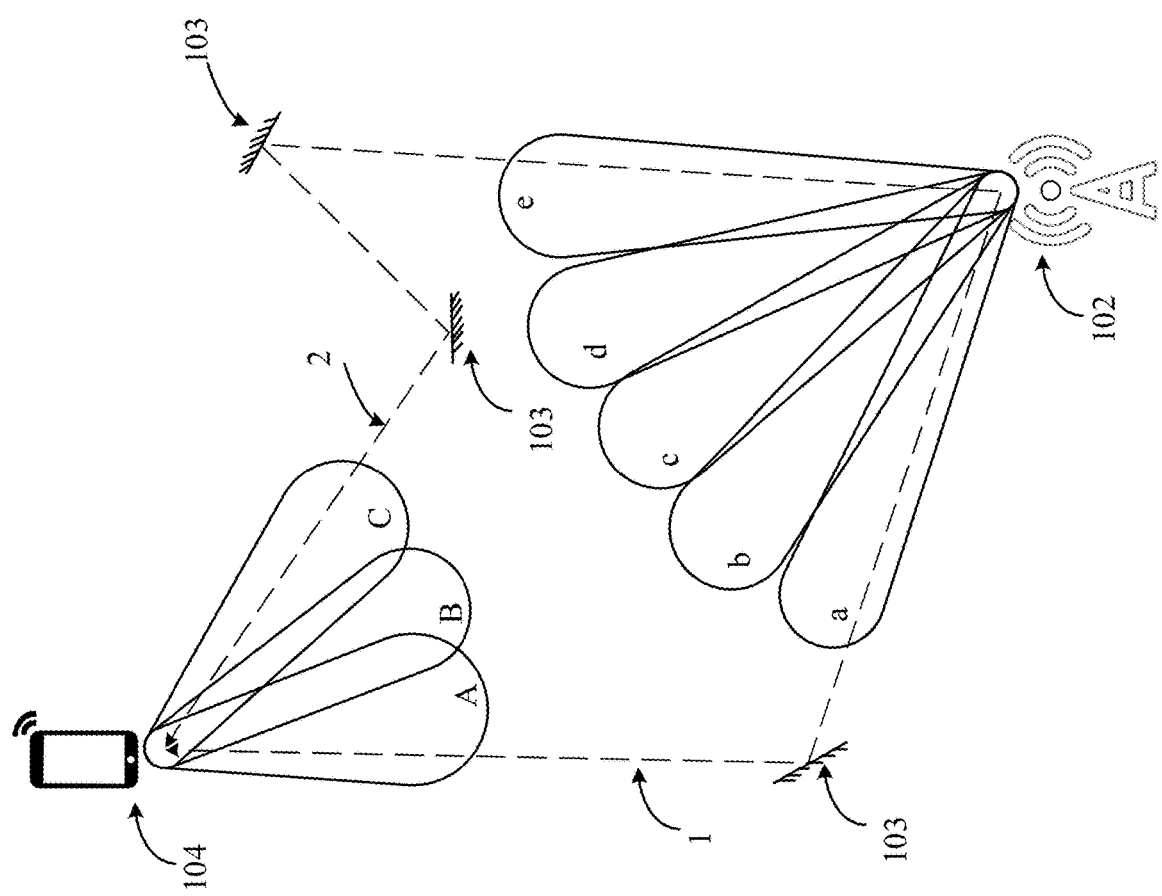
Figure 7C:
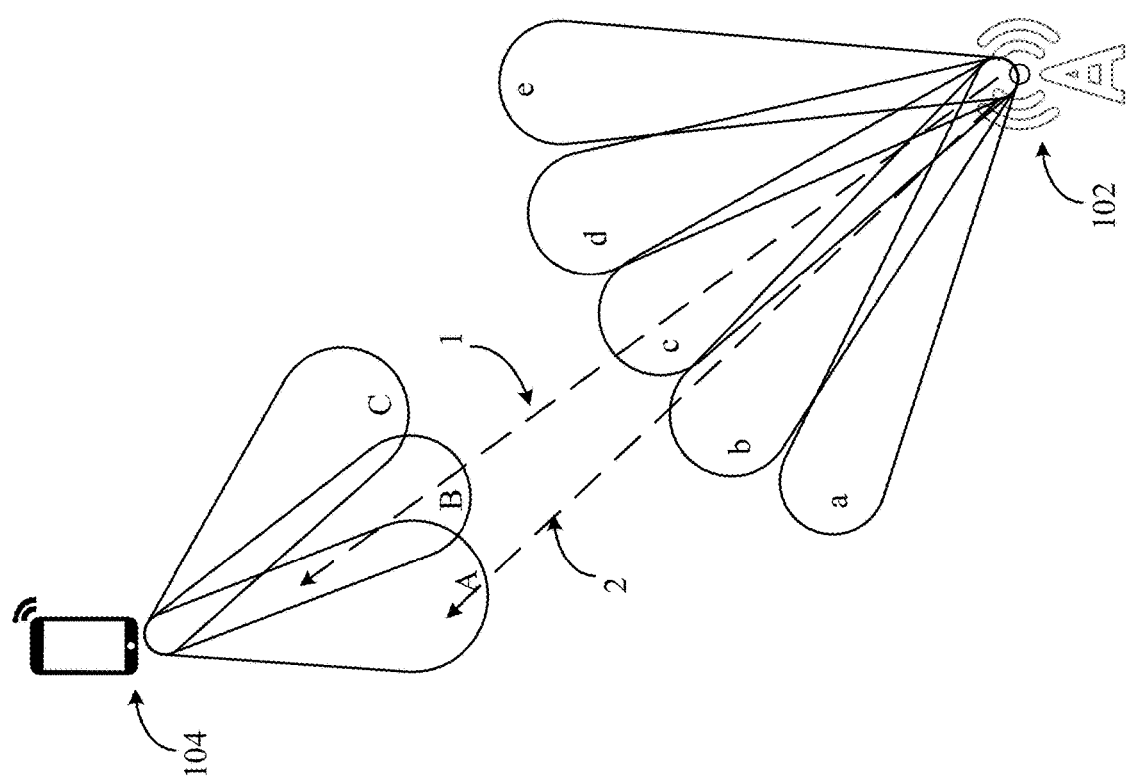

FIGS. 7A-7C illustrate schematic diagrams of determining a beam in an embodiment. In an example as FIG. 7A, the transmission path 1 has a shorter path length than the transmission paths 2 and 3. Thus, the beam B of the UE 104 and the beam c of the access device 102 may be determined as the beams suitable for the two sides of the mm-wave communication.

In FIG. 7B, the number of reflections in the transmission path 1 is one, and the number of reflections in the transmission path 2 is two. Thus, the beam A of the UE 104 and the beam a of the access device 102 may be determined as the beams suitable for the mm-wave communication.

In FIG. 7C, the transmission path 1 is located at the center of the beam pattern of the UE 104 and the beam pattern of the access device 102, while the transmission path 2 is located at the edge of the beam pattern of the UE 104 and the beam pattern of the access device 102. Therefore, the beam B and the beam c may be determined as the two beams suitable for the two sides of the mm-wave communication.

Different beams in a beam pattern may be assigned with a weight. A beam with the largest weight may be determined as being the most suitable beam for mm-wave communication. Or, a different transmission path in a beam pair covering at least one same transmission path maybe assigned with different weights according to different considerations. The weights of the transmission path of the beam pairs are subsequently summed, and the beam in a beam pair with the largest summed weight is chosen as the beam for the mm-wave communication.

In an uplink transmission, in an embodiment of the present disclosure, the UE 104 may use its own transmit beam pattern and the receive beam pattern of the access device 102 to determine a beam pair. The beams in the determined beam pair have the best transmission performance for mm-wave communication, such as high transmission quality and efficiency. The determined beam pair may also be known as a best beam pair or an optimal beam pair. The transmit beam in the best beam pair is determined as the transmit beam of the UE 104. Since UE 104 has known the information of the transmission path, e.g., the AoA and the AoD, the UE 104 may map the transmission path to the transmit beam pattern of the UE 104 and the receive beam pattern of the access device 102 to determine which beams the transmission paths belong to. Due to the access device 102 and the UE 104 have same reference compass, i.e., they have a same geographic north direction and a same vertical direction, both of the access device 102 and the UE 104 may determine same mapping result according to beam pattern information and information of the transmission paths.

According to the mapping result, if there is at least one transmission path that overlaps a transmit beam of the UE 104 and a receive beam of the access device 102, i.e., the transmit beam of the UE 104 and the receive beam of the access device 102 cover at least one same transmission path, then the transmit beam of the UE 104 and the receive beam of the access device 102 compose a beam pair.

Figure 8:
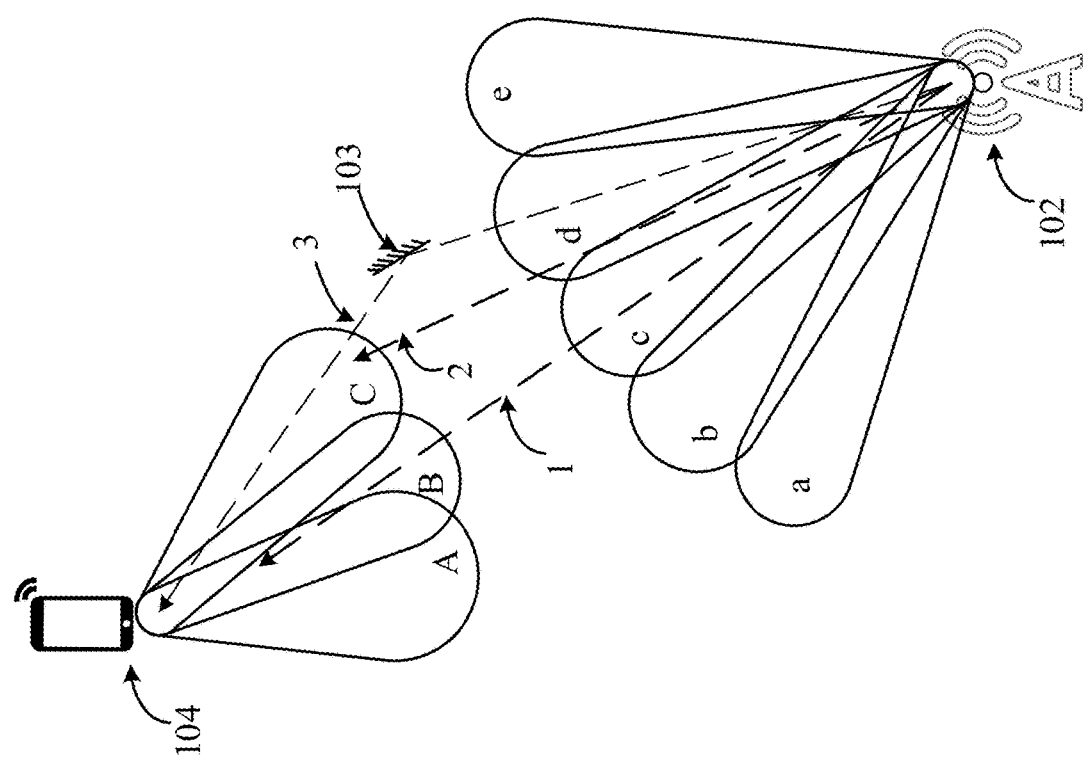
FIG. 8 illustrates a schematic diagram of determining a beam in an embodiment.

FIG. 8 illustrates a schematic diagram of determining a beam in an embodiment. As the example in FIG. 8, the transmission path 1 overlaps the beam B of the UE 104 and the beam c of the access device 104, while the transmission paths 2 and 3 overlap the beam C of the UE 104 and the beam d of the access device 104. Therefore, the beam B and beam c may comprise a beam pair {B, c}, and the beam C and the beam e may comprise a beam pair {C, d}. A beam pair covering a maximum number of possible transmission paths is determined as the best beam pair, and the transmit beam in the best beam pair may be determined to be the transmit beam pair of the UE 104 for uplink transmission in mm-wave communication.

In an example, a weight W may be assigned to the beam pair $\{B_{tx}, B_{rx}\}$ according to $$W((B_{tx}, B_{rx})) = |R(B_{tx}) \cap R(B_{rx})| \quad (2)$$

Where $B_{tx}$ represents the transmit beam of the UE 104 and where $B_{rx}$ represents the receive beam of the access device 102. The $<B_{tx}, B_{rx}>$ term constitutes a beam pair. The $R(B_{tx})$ and $R(B_{rx})$ terms denote the transmission path that overlap $B_{tx}$ and $B_{rx}$ respectively.

This scheme assigns weights to beam pairs, thus enabling a ranking of beam pairs. As a result, a natural order may be established for the order in which beam pairs are tried. The beam pair having a largest weight may be determined as the best beam pair to use. In this example, the weight is assigned according to the number of transmission paths overlapping on the same beam pair. If the transmission path overlapping between the transmit beam and the receive beam is more, then the corresponding beam pair has a larger weight. Optionally, the weight may be a positive integer. The transmit beam in the beam pair is determined as the transmit beam of the UE 104 for the mm-wave communication. Given the selected beam pair covering the maximum number of transmission paths between the UE 104 and the access device 102, the mm-wave communication may have best transmission performance via the determined transmit beam of the UE 104.

Figure 9:
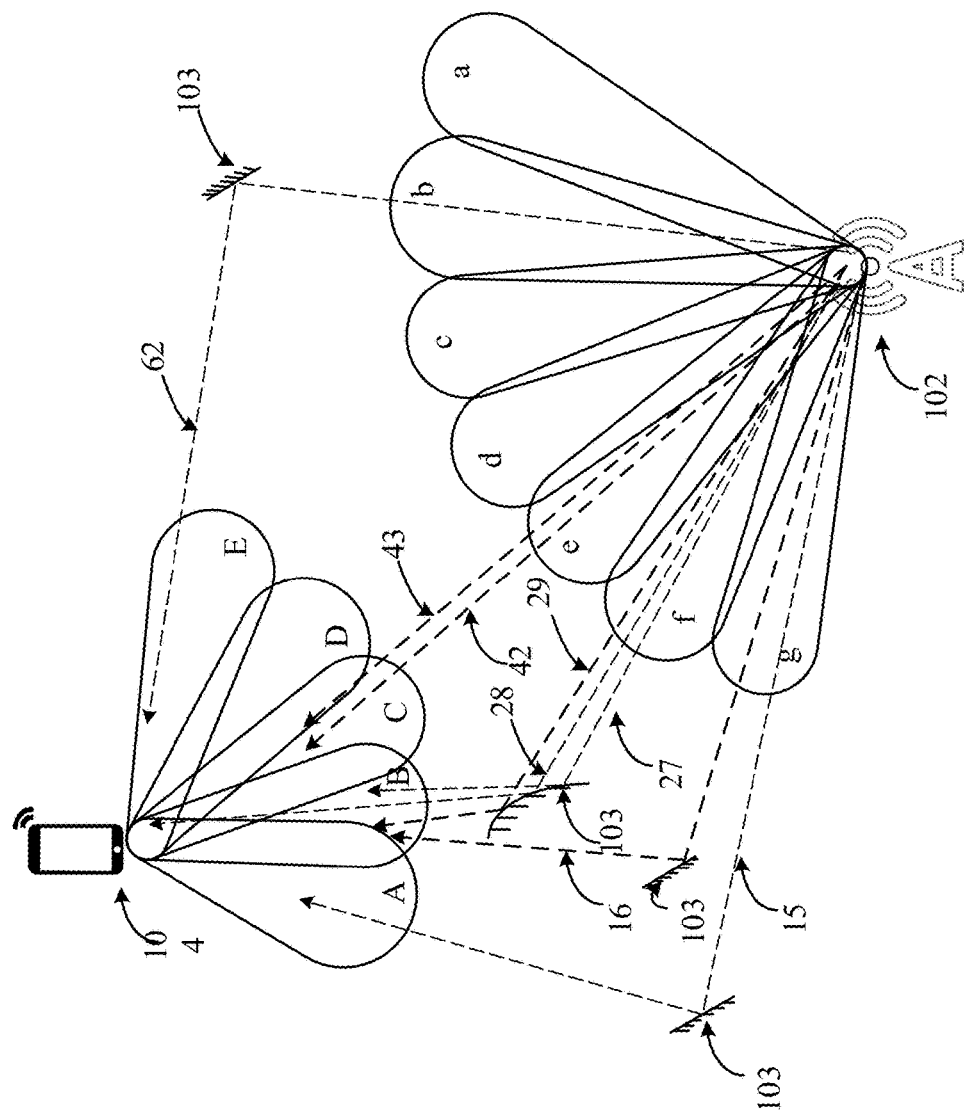
FIG. 9 is a diagram of determining a beam in an embodiment.

FIG. 9 is a diagram of determining a beam in an embodiment. In an example, a receive beam pattern of the access device 102 has 7 receive beams, i.e., beam a to beam g. A transmit beam pattern of the UE 104 has 5 transmit beams comprising beam A to beam E. In the example, the UE 104 and the access device 102 identify that there are 8 transmission paths available between the access device 102 to the UE 104, transmission paths 15, 16, 27, 28, 29, 42, 43, and 62. By mapping the transmission paths to the beam pattern of the UE 104 and the beam pattern of the access device 102, the transmission path 15 is overlapped to a beam pair {A, g}, the transmission path 16 is overlapped to beam pair {B, g}, the transmission paths 27, 28 and 29 are overlapped to beam pair {B, f}, the transmission paths 42 and 43 are mapped to beam pair {C, e}, and the transmission path 62 is mapped to a beam pair {E, b}. Because the beam pair {B, f} cover three transmission paths 27, 28, and 29, a weight, for example, a positive integer 3 may be assigned to the beam pair {B, f}. The beam pair {C, e} covers two transmission paths 42 and 43, a weight, for example, a positive integer 2 may be assigned to the beam pair {C, e}. The beam pairs {A, g}, {B, g}, and {E, b} cover one transmission path respectively, and therefore each one of the beam pairs {A, g}, {B, g}, and {E, b} may be assigned a weight, for example, a positive integer 1. Therefore, the beam pair {B, f} may be assigned with a weight larger than any one of beam pairs {A, g}, {B, g}, {C, e} and {E, b}. The UE 104 can choose the uplink transmit beam B in the beam pair {B, f} as the uplink mm-wave beam to be used for mm-wave communication.

In another example, the determination of the best beam pair may be further based on at least one of path length of the transmission path, the number of reflections and/or refractions of the transmission path, or the position of the transmission path in a beam pattern.

Each one of the different transmission paths may be assigned weights based on different considerations. A transmission path with a long path may have higher path loss than a transmission path with a short path. Thus, the weight may be inversely proportional to the length of a transmission path. The transmission path having a shorter path may be assigned a larger weighting number. A transmission path having a greater number of reflections may have more path loss than a transmission path having a less number of reflections. Thus, the transmission path having a less number of reflections may be assigned a larger weight.

Furthermore, in beam patterns, radiated energy is greater at the center of the beam pattern and lower towards the edge of the beam pattern. To account for this, weights may be assigned to the transmission paths based on their position within the beam pattern, namely, a transmission path closer to the center of the beam pattern may have a larger weight than a transmission path closer to the edge of the beam pattern. By considering this, the beam determined for mm-wave communication may have better transmission performance.

As an example in FIG. 9, in transmission paths 15, 16, 27, 28, 29, 42, 43 and 62, the positions of transmission paths 42 and 43 are closer to the center of the transmit beam pattern of the UE 104 and the receive beam pattern of the access device 102 than other positions of transmission paths. As a result, the transmission paths 42 and 43 may be assigned with weights larger than the other transmission paths. Similarly, the positions of the transmission paths 27, 28 and 19 are close to the center position of the transmit beam pattern of the UE 104 and the receive beam pattern of the access device 102 than the position of transmission paths of 15, 16, and 62. As a result, the transmission paths may be assigned with weights larger than transmission paths 15, 16, and 62.

Similarly, the lengths of transmission paths 42 and 43 are shorter than the lengths of other transmission paths. Therefore, the transmission paths 42 and 43 may be assigned with a weight larger than other transmission paths. Similarly, the lengths of transmission paths 27, 28 and 29 are shorter than the lengths of the transmission paths 15, 16 and 62. There-fore, the transmission paths 27, 28 and 29 may be assigned a weight larger than other transmission paths 15, 16 and 62.

Weights assigned to each transmission path can then be summed:

$$W((B_{tx}, B_{rx})) = \Sigma_{r \in R(B_{tx}) \cap R(B_{rx})} Wt(r) \qquad (3)$$

Wt(r) assigns a weight to a transmission path r. Then the weights are summed for all transmission paths that overlap both the transmit beam of the UE 104 and the receive beam of the access device. This summing enables ranking of beam pairs, and therefore the best beam pair may be the beam pair with the largest weight.

Multiple weights may be assigned per transmission path. For example, a length weight of the transmission path, a number weight of reflections and/or refractions in the transmission path, or the position weight of the transmission path in the beam pattern may be assigned to each transmission path. As an example, the transmission paths 42 and 43 have the shortest length among all transmission paths, and transmission paths 42 and 43 exist between the UE 104 and the access device 102 directly, without reflection or refraction. Moreover, the transmission paths 42 and 43 are at the center of the beam pattern of the UE 104 and the beam pattern of the access device 102. Therefore, the summed weight of transmission paths 42 and 43 in beam pair {C, e} may be larger than the summed weight of transmission paths 27, 28, and 19 in beam pair {B, f}, or larger than any other summed weight of transmission paths in other beam pairs. Then the beam pair {C, e} may be determined as the best beam pair, and the transmit beam C may be determined as the transmit beam of the UE 104 for mm-wave communication.

In the uplink transmission of the embodiment of the present disclosure, due to the access device 102 and the UE 104 having a same reference compass, i.e., they all have a same geographic north direction and a same vertical direction, both of the access device 102 and the UE 104 may determine the same mapping result as above. Therefore, the access device 102 can also determine the number of the transmission paths mapped to each receive beam of the access device 102, and the best beam pair.

The access device 102 may choose more than one beam as a receive beam. As an example, the access device 102 may use the receive beam in the best beam pair as the receive beam for mm-wave communication.

Alternatively, the access device 102 may not have up-to-date information about the transmit beam patterns and the orientation of the UE 104. For each receive beam at the access device 102, the number of contiguous transmission paths is considered. The receive beam comprising the largest contiguous set of transmission paths may be determined as the receive beam for mm-wave communication. If there is more than one beam having the same largest contiguous set of transmission paths, then multiple beams may be selected as receive beams for the mm-wave communication.

Figure 10:
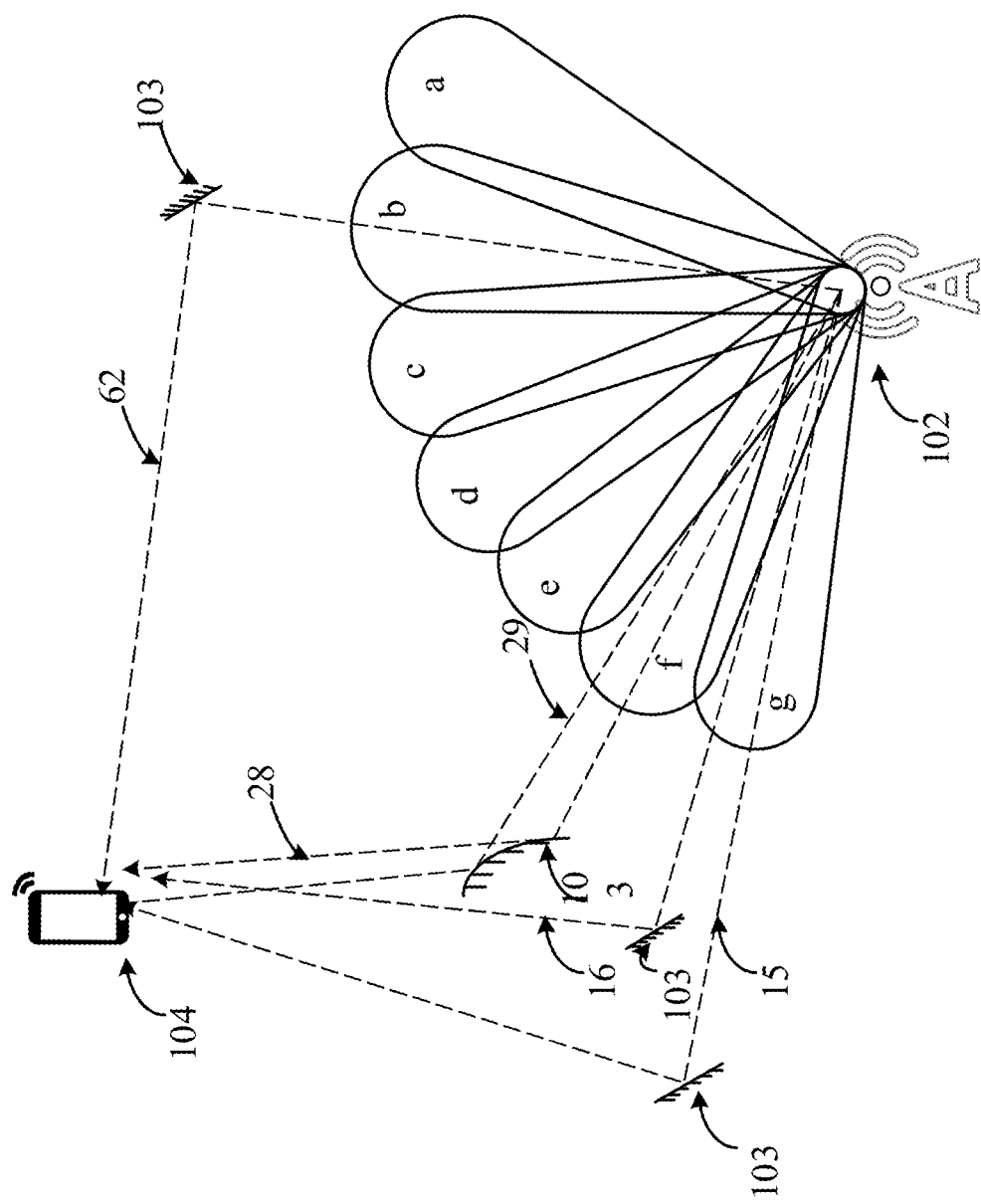
FIG. 10 is a diagram of determining a beam in an embodiment.

FIG. 10 is a diagram of determining a beam in an embodiment. FIG. 10 illustrates transmission paths 15 and 16 that fall into a receive beam g, transmission paths 28 and 29 fall into receive beam f, and transmission path 62 falls into receive beam b. The access device 102 may select either beam for g, or both of beams f and g. In this situation, if the access device 102 does not need to know the transmit beam pattern of the UE 104, based on the transmission paths, the access device 102 may identify mm-wave clusters that fall into the receive beams of the access device 102. The access device 102 may try the selected receive beams. In this example shown in FIG. 10, receive beams f and g are the possibilities. The access device 102 tries beam f and g both either in sequence or simultaneously. By doing so, there is no need for the UE 104 to report transmit beam pattern information to the access device 102. As a result air interface resources are conserved.

Alternatively, in another example of the uplink transmission, the access device 102 does not need to determine the receive beam for communication by itself. The access device 102 may obtain the receive beam according to beam pair information from the UE 104. In one example, both of the UE 104 and the access device 102 can support a wireless cellular network and the UE 104 may have already established a link with the access device 102. After the UE 104 determines the best beam pair, the UE 104 may signal beam pair information to the access device 102 out of band, for example, via an LTE link. The access device 102 may select the receive beam in the best beam pair indicated by the UE 104.

In a downlink transmission, in an embodiment of the present disclosure, the access device 102 needs to determine a transmit beam of the access device 102 for mm-wave communication. The UE 104 needs to determine a receive beam of the UE 104 for the mm-wave communication.

Determining the transmit beam in the downlink transmission may follow the method of how the UE 104 determines the transmit beam of the UE 104 in the uplink transmission. The access device 102 may use its own transmit beam pattern and the receive beam pattern of the UE 104 to determine a best beam pair. The transmit beam in the best beam pair is determined as the transmit beam of the access device 102. The access device 102 may map the transmission paths to the transmit beam pattern of the access device 102 and the receive beam pattern of the UE 104 to determine which beams the transmission paths belong to.

As the UE 104 determines the transmit beam in an uplink transmission, a weight W may be assigned to beam pairs in the determining of a transmission beam of the access device 102 in a downlink transmission. Moreover, in another example, the determination of the best beam pair in a downlink transmission may also be further based on at least one of path length of the transmission paths, the number of reflections of the transmission paths, and/or the position of the transmission paths in an antenna pattern. Each one of the different transmission paths may be assigned weight based on different considerations. The weights may be inversely proportional to the length of the transmission path. The transmission path having smaller number of reflections may be assigned larger weights. The transmission path closed to the center of the beam pattern may be assigned larger weights than the transmission path closed to the edge of the beam patter. Weights assigned to each transmission path can then be summed, and the best beam pair may be the beam pair with the largest summed weight. The details may be identical to the procedure for determination of transmit beam of the UE 104 described above.

In the downlink transmission of the embodiment of the present disclosure, the UE 104 can also determine the transmission path mapped to each receive beam of the UE 104, and further determine the best beam pair.

The UE 104 may determine multiple beams as the receive beams. As an example, the UE 104 may use the receive beam in the best beam pair as the receive beam for mm-wave communication.

Alternatively, the UE 104 may not have up-to-date information about the transmit beam patterns and the orientation of the access device 102. If there is more than one beam having the same largest contiguous sent of transmission paths, the beams may be selected as receive beams for mm-wave communication.

Alternatively, in another example of the downlink transmission, the UE 104 does not need to determine the receive beam for communication by itself. The UE 104 may obtain the receive beam according to beam pair information from the access device 102. In one example, both of the UE 104 and the access device 102 can support wireless cellular network and the UE 104 has established a link with the access device 102. After the access device 102 determines the best beam pair, the access device 102 may signal beam pair information to the UE 104 out of band, for example, e.g., via an LTE link. The UE 104 may selects the receive beam in the best beam pair indicated by the access device 102 for mm-wave communication.

Alternatively, the UE 104 may search in not only the determined receive beam but also in at least one other beam that is spatially adjacent to the determined receive beam. Thus, for situations where the prediction accuracy is low, performance may be improved.

The details of the determining of a receive beam of the UE 104 in downlink transmission is identical to the determining of receive beam of the access device 102 in the uplink transmission as described above.

In the mm-wave communication, UEs closer to an access device may use a wider beam than UEs farther away from the access device. Therefore, UEs using a narrower beam in the mm-wave system may have better performance at overcoming path loss of mm-wave signals. The UEs using a wider beam may have more accurate prediction performance. Accordingly, the system may have high performance as a whole.

Figure 11:
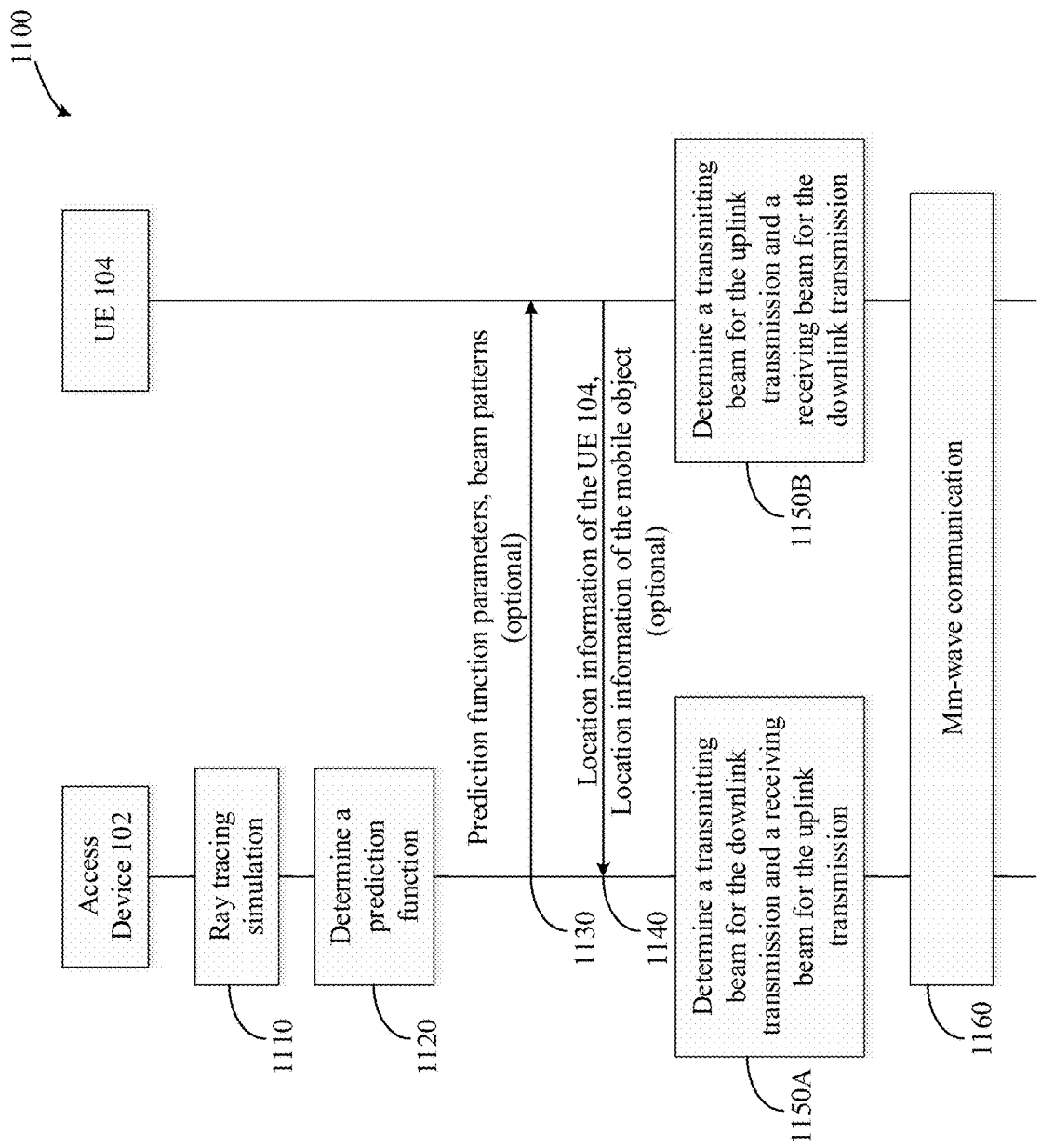
FIG. 11 is a flowchart of a mm-wave communication method in an embodiment.

FIG. 11 is a flowchart of a mm-wave communication method 1100 in an embodiment. The method 1100 may be performed in the system 10 and performed by the UE 104, the access device 102, or the node 106 as illustrated in FIG. 1. The above described embodiments and examples of the present disclosure and corresponding figures may also be applied to implement the method.

In operation 1110, the access device 102 performs a ray tracing simulation.

In operation 1120, the access device 102 determines a prediction function.

In operation 1130, the access device 102 sends prediction function parameters to the UE 104. Additionally, the access device 102 may further send the receive beam pattern and the transmit beam pattern to the UE 104.

In operation 1140, the access device 102 receives the location information of the UE 104, such as from the UE 104. The UE 104 in some embodiments may obtain the location information of the UE 104 and may further obtain the location information of the mobile object 103. Optionally, the UE 104 sends the location information of the mobile object 103 to the access device 102. The operation 1140 is optional if the access device 102 obtains the location information of the UE 104 and the mobile object 103. The UE 104 further sends the receive beam pattern and the transmit beam pattern to the access device 102. The operation 1140 may be performed at any time.

In operation 1150A, the access device determines a transmit beam for downlink transmission and a receive beam for uplink transmission.

In operation 1150B, the UE 104 determines a transmit beam for uplink transmission and a transmit beam for uplink transmission.

In operation 1160, the UE 104 and the access device 102 communicate with each other via the determined beams.

Figure 12A:
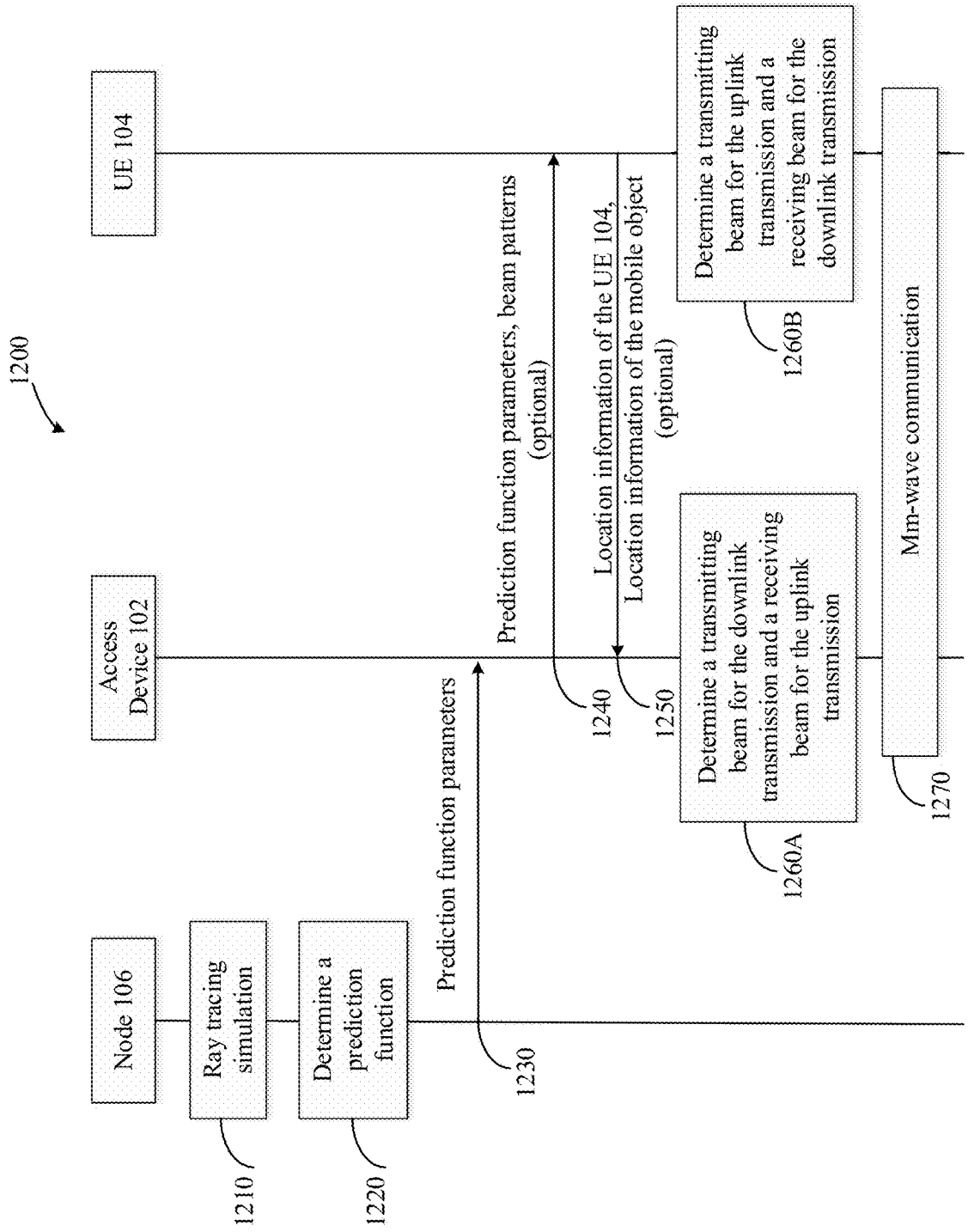
FIG. 12A is a flowchart of a mm-wave communication method in an embodiment.

FIG. 12A is a flowchart of a mm-wave communication method 1200 in an embodiment. The method 1200 may be performed in the system 10 and performed by the UE 104, the access device 102, or the node 106 as illustrated in FIG. 1.

In operation 1210, the node 106 performs ray tracing simulation.

In operation 1220, the node 106 determines the prediction function.

In operation 1230, the node 106 sends prediction function parameters to the access device 102. The access device 102 receives and saves the prediction function parameters.

In operation 1240, the access device 102 sends the prediction function parameters to the UE 104. Additionally, the access device 102 further sends the receive beam pattern and the transmit beam pattern to the UE 104. In operation 1250, the access device 102 receives the location information of the UE 104 from the UE 104. Optionally, the access device 102 receives the location information of the mobile object 103 from the UE 104. The UE 104 may obtain the location information of the UE 104 And may further obtain the location information of the mobile object 103. The operation 1250 is optional if the access device 102 obtains the location information of the UE 104 and the mobile object 103 by itself. The UE 104 further sends the receive beam pattern and the transmit beam pattern to the access device 102. The operation 1250 may be performed at any time.

In operation 1260A, the access device determines a transmit beam for downlink transmission and a receive beam for uplink transmission.

In operation 1260B, the UE 104 determines a transmit beam for uplink transmission and a transmit beam for uplink transmission.

In operation 1270, the UE 104 and the access device 102 communicate with each other via the determined beams.

Figure 12B:
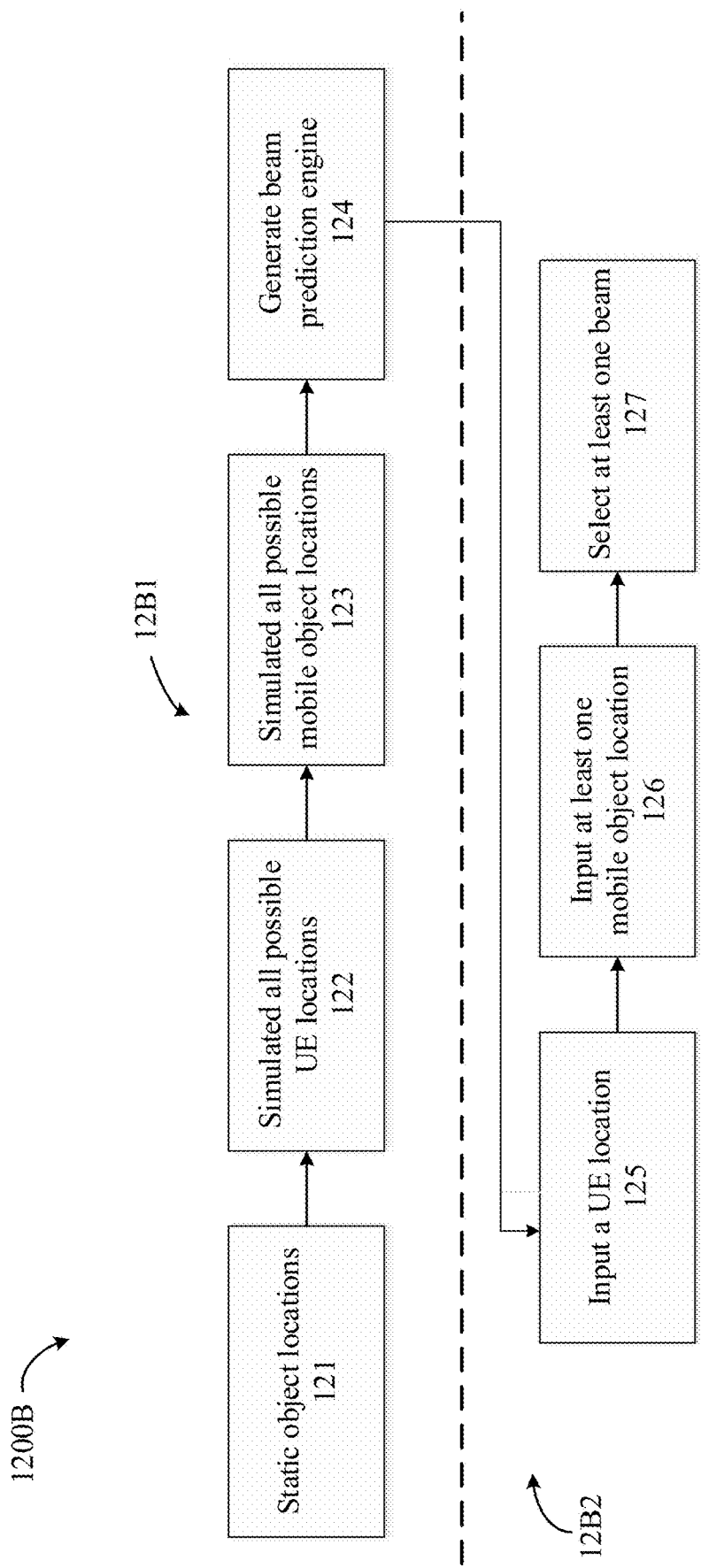
FIG. 12B is a flowchart of a mm-wave communication method in an embodiment.
Figure 12C:
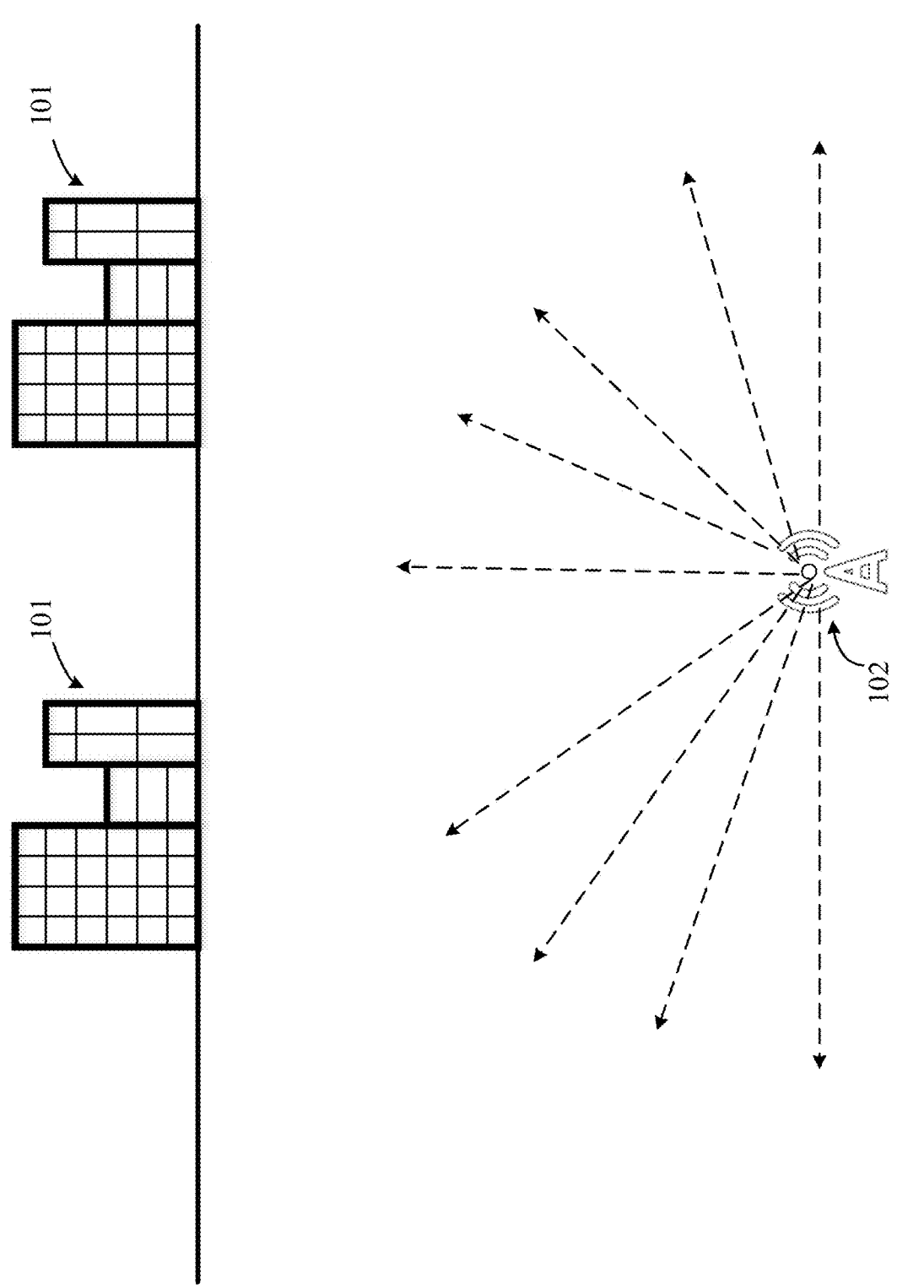
FIG. 12C is a ray tracing simulation in an embodiment.

FIG. 12B is a flowchart of a mm-wave communication method 1200B in an embodiment. In the illustrated embodiment, an initial preparation phase 12B1 and a process phase 12B2 are included. In the initial preparation phase 12B1, static object locations are provided in operation 121, for example, in a 3D map. FIG. 12C is a ray tracing simulation in an embodiment. As in an simulated system 10 shown in FIG. 12C, static objects 101 and access device 102 are provided.

Figure 12D:
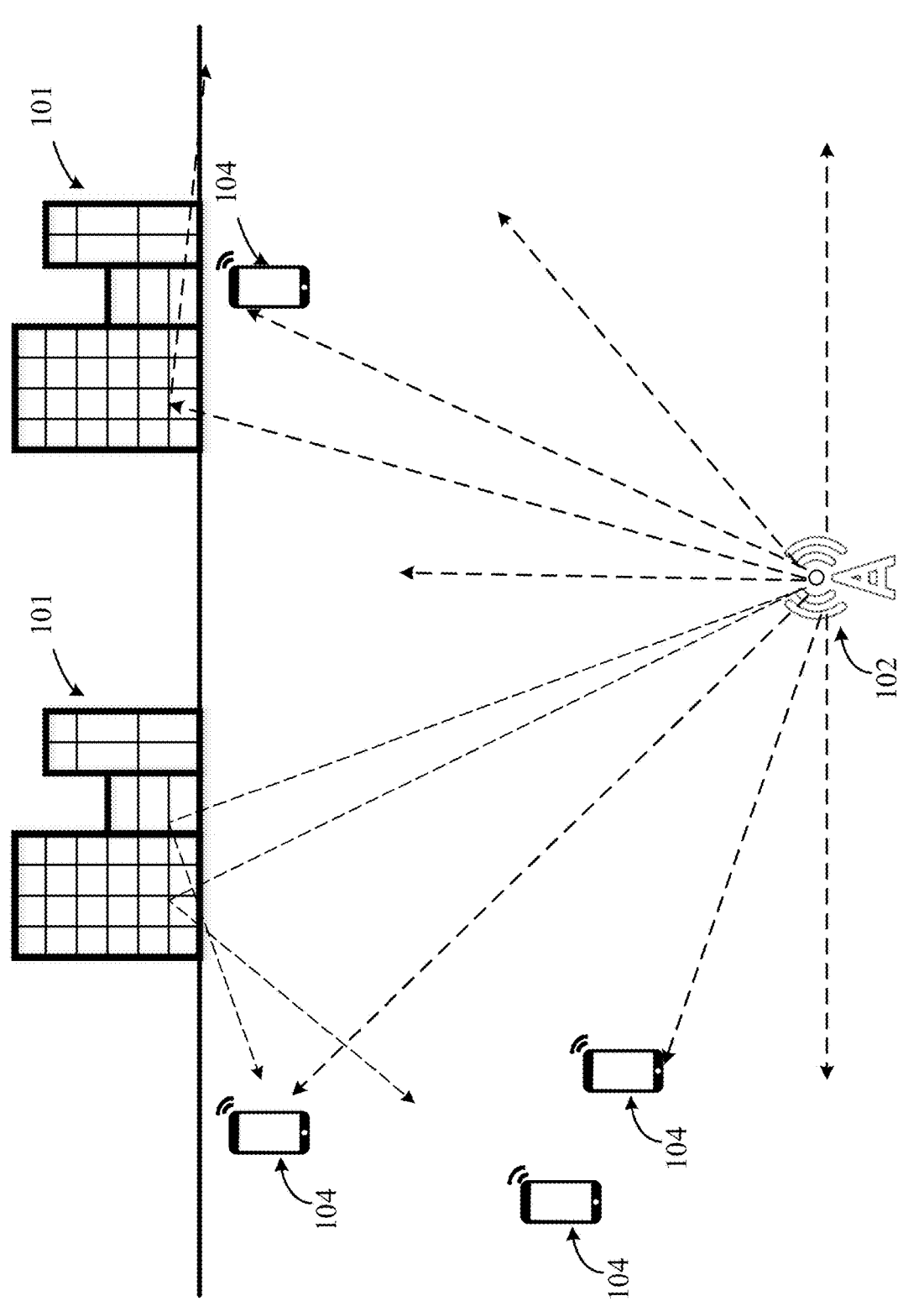
FIG. 12D is a ray tracing simulation in an embodiment.

In operation 122, all possible UE locations are simulated (see FIG. 12D, where at least one simulated UE 104 is considered in the simulation). In the simulation, the rays transmitted from the access device 102 may reach the UE 104 directly, or may reach the UE 104 indirectly, such as by reflection or refraction.

Figure 12E:
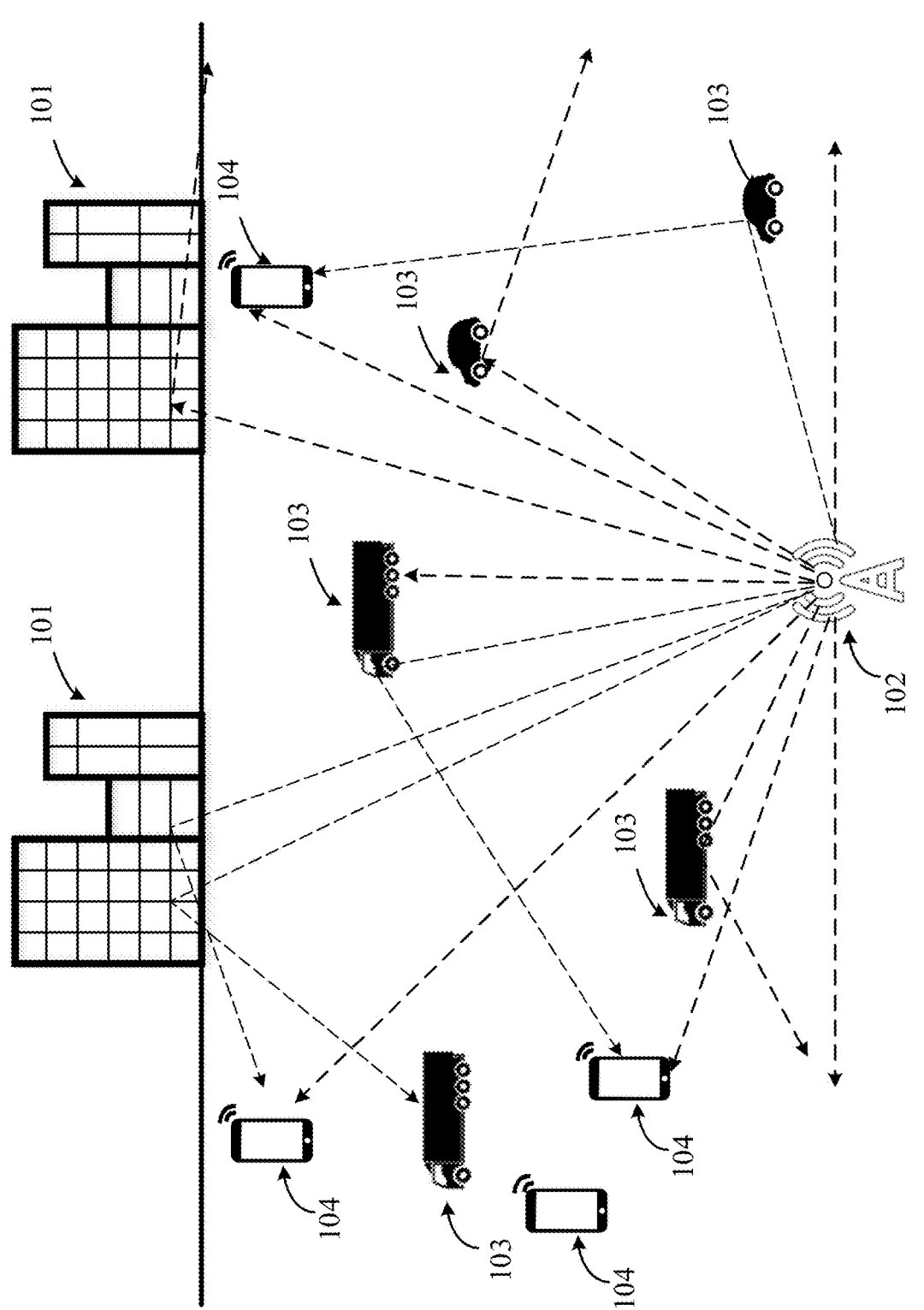
FIG. 12E is a ray tracing simulation in an embodiment.

In operation 123, all mobile object locations are simulated (see FIG. 12E, where at least one simulated mobile object 103 is placed in the simulation). In the simulation, the rays transmitted from the access device 102 may be blocked by the simulated mobile objects 103. In the simulation, some rays may reach the UE 104 by reflection of the simulated mobile objects 103 and the static objects 101. In the ray tracing simulation, the rays capable of reaching the simulated UE 104 can then be identified.

In operation 124, the beam prediction engine may be determined according to the simulation results. The generation details may comprise operation 402 of FIG. 4.

In the process phase 12B2, a UE location may be input into the beam prediction engine in operation 125. A set of possible mm-wave beams can be identified according to the UE location and the locations of the static objects 101.

In operation 126, at least one mobile object location is input into the beam prediction engine. A subset of mm-wave beams are selected from the set of possible mm-wave beams according to the mobile object location, refining the set of beams that were determined in operation 125 above. The UE location and the at least one mobile object location may be input into the beam prediction engine substantially concurrently.

In operation 127, at least one mm-wave beam is selected for mm-wave communication. In one example, the beam can be selected from the subset of possible beams according to a physical distance of identified transmission path as described above. Alternatively, the beam can be selected from the subset of possible beams according to a number of reflection or refraction of identified transmission path as described above. Or, the beam can be selected from the subset of possible beams according to a distance from a center of a predefined beam pattern.

In one example, the above operations 121-124 may be performed by the access device 102 or a node 106. The operations 125-127 may be performed by the access device 102, the UE 104, the node 106, or other network device, server that selects beam for the UE 104 and the access device 102.

Figure 12F:
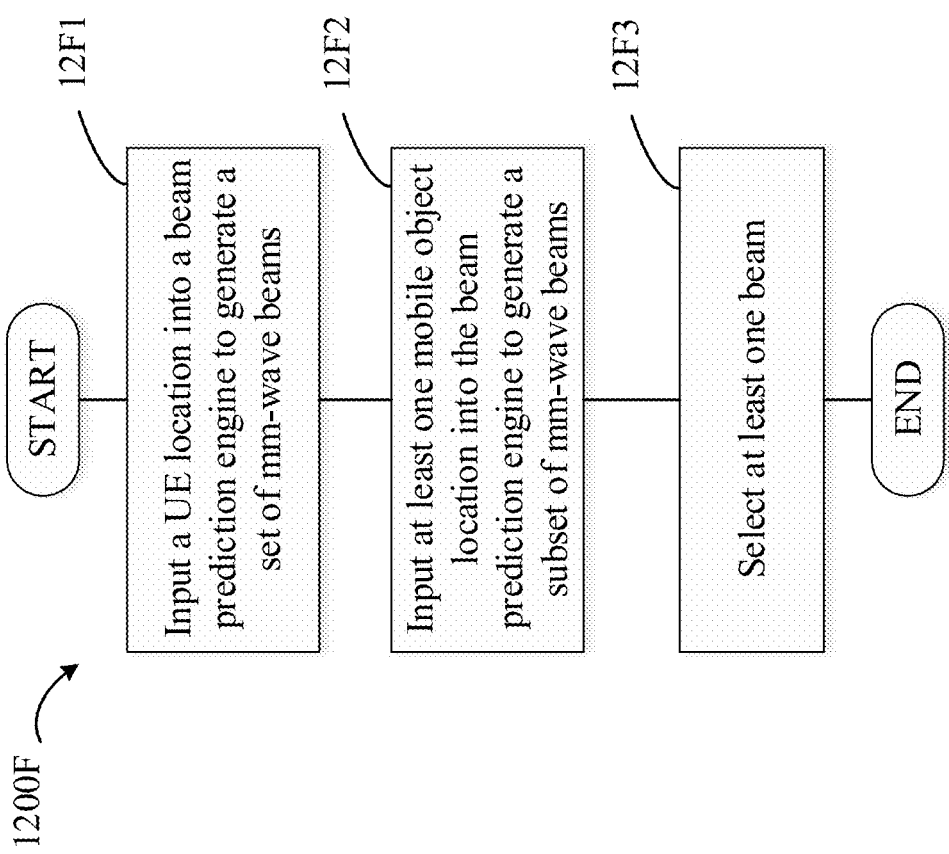
FIG. 12F is a flowchart of a mm-wave communication method in an embodiment.

FIG. 12F is a flowchart of a mm-wave communication method 1200F in an embodiment.

In step 12F1, a network device inputs a UE location into a beam prediction engine to generate a set of mm-wave beams.

In step 12F2, the network device inputs at least one mobile object location of at least one mobile object into the beam prediction engine to select a subset of mm-wave beams.

In step 12F3, the network device select at least one beam from the subset of mm-wave beams.

The network device may be the access device 102 or the UE 104. The access device 102 or the UE 104 may select at least one beam separately, and communicate with each other via the selected beam.

Figure 12G:
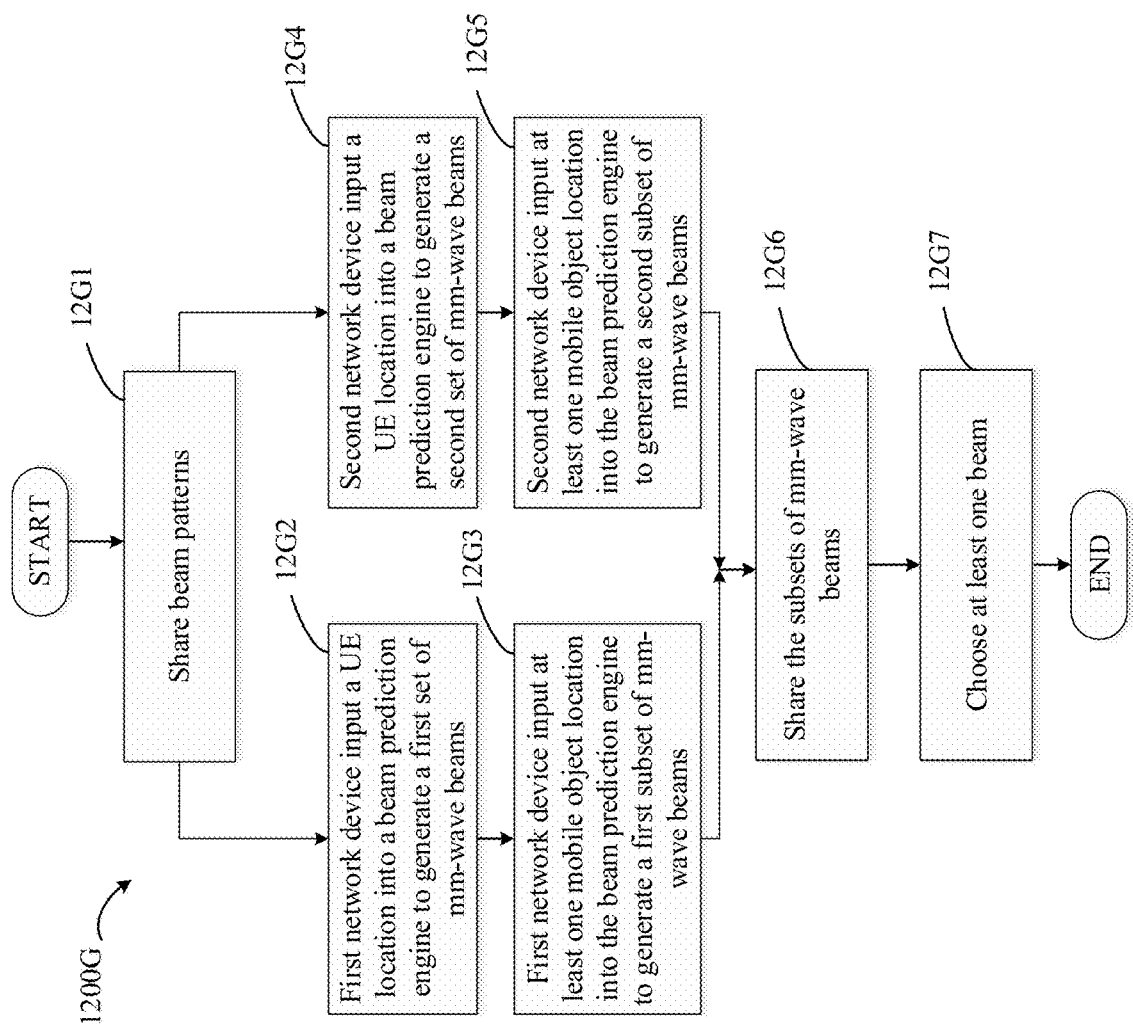
FIG. 12G is a flowchart of a mm-wave communication method in an embodiment.

FIG. 12G is a flowchart of a mm-wave communication method 1200G in an embodiment.

In step 12G1, beam patterns are shared between a first network device and a second network device. The beam patterns may include a beam pattern of a UE and a beam pattern of an access device. The first and second network devices may share the beam patterns before generation of the beam prediction engine, or after the generation of the beam prediction engine. Alternatively, the first and second network devices may share the beam patterns before inputting the UE location and the mobile object location into the beam prediction engine. Or, the first and second network devices may share the beam patterns after inputting the UE location and the mobile object location into the beam prediction engine.

In step 12G2, the first network device inputs a UE location into a beam prediction engine to generate a first set of mm-wave beams.

In step 12G3, the first network device inputs at least one mobile object location of at least one mobile object into the beam prediction engine to select a first subset of mm-wave beams.

In step 12G4, the second network device inputs a UE location into a beam prediction engine to generate a second set of mm-wave beams.

In step 12G5, the second network device inputs at least one mobile object location of at least one mobile object into the beam prediction engine to select a second subset of mm-wave beams.

In step 12G6, the first and second network devices may share the selected first and second subsets of mm-wave beams.

In step 12G7, the first and second network devices may choose at least one beam pair. In one example, one of the first and second network device may select both beams of the beam pair. Alternatively, both the first and second device take part in selecting beams of the beam pair.

In one example, the first network device may comprise the UE 104, and the second network device may comprise the access device 102. Alternatively, both the first network device and second network device may all UEs, or both the first network device and second network device may be access devices. When the UE selects beams of the access device, the UE may send the selection to the access device. When the AP selects beams of UE, the AP may send the selection to the UE. Alternatively, at least one of the first and second network devices may comprise other network node, server, etc., that may select beam for the UE or the access device.

An embodiment of the present disclosure provides a system comprising the above first and second network device.

Figure 13:
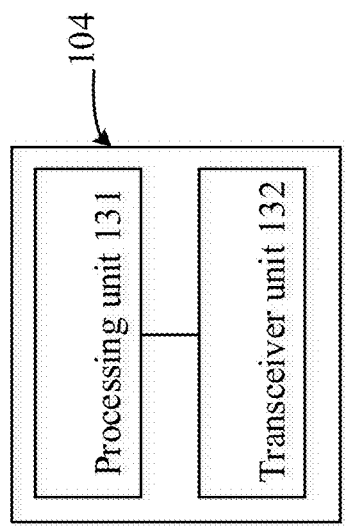
FIG. 13 is a block diagram of a UE in an embodiment.

FIG. 13 is a block diagram of a UE 104 in an embodiment. The UE 104 comprises a processing unit 131 and a transceiver unit 132. The processing unit 131 and the transceiver unit 132 as illustrated in FIG. 13 may be implemented with one or more features of any one or more of the embodiments set forth in any previous and/or subsequent figure(s) and/or the description thereof.

The processing unit 131 is configured to determine at least one transmission path between the UE 104 and an access device 102 in accordance with a prediction function parameter, and a location of the UE and a location of at least one mobile object, and to determine a mm-wave beam according to the transmission path.

The transceiver unit 132 is configured to communicate with the access device via the mm-wave beam determined by the processing unit 131.

The transceiver unit 132 is further configured to receive the prediction function parameter from the access device 102. The prediction function parameter may be generated by the access device 102 or by the node 106. The transceiver unit 132 may be further configured to send location information of the UE 104 to the access device 102. Optionally, the transceiver unit 132 may also send location information of neighboring mobile object to the access device 102.

Figure 14:
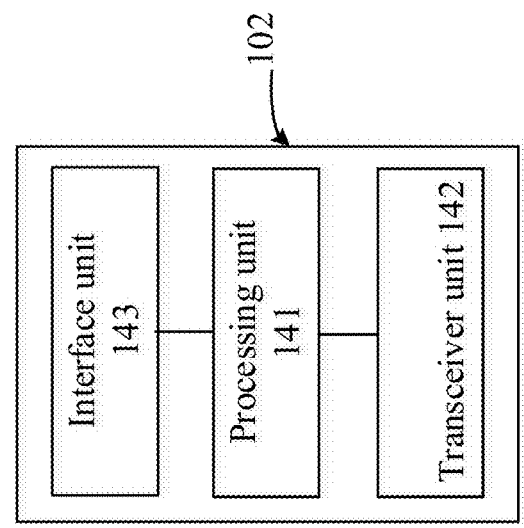
FIG. 14 is a block diagram of an access device in an embodiment.

FIG. 14 is a block diagram of an access device 102 in an embodiment. The access device 102 comprises a processing unit 141 and a transceiver unit 142. Optionally, the access device 102 may further comprise an interface unit 143 The processing unit 141, the transceiver unit 142 and the interface unit 143 as illustrated in FIG. 14 may be implemented with one or more features of any one or more of the embodiments set forth in any previous and/or subsequent figure(s) and/or the description thereof.

The processing unit 141 is configured to determine at least one transmission path between the access device 102 and a UE 104 in accordance with a prediction function parameter, a location of the UE, and a location of at least one mobile object. The processing unit 141 is further configured to determine a mm-wave beam according to the transmission path.

The processing unit 141 may be further configured to perform a ray tracing simulation to identify a ray that transmits from a location of the access device 102 and reach a location of a simulated UE. The mobile object information may be considered in the ray tracing simulation. Specifically, the processing unit 141 may be configured to identify a ray that is capable of reaching a location of a simulated UE according to static object information of an area at where the access device 102 is located and a location of a simulated mobile object, where the ray is transmitted from a location of the access device 102. Moreover, the processing unit 141 may be further configured to determine the prediction function parameter according to the identified ray and the location of the simulated UE. For example, the processing unit 141 may perform machine learning to determine the prediction function parameter.

Alternatively, the prediction function parameter may be generated by the node 106. The interface unit 143 is configured to receive the prediction function parameter from the node 106.

The transceiver unit 142 is configured to transmit the prediction function parameter to the UE 104. Optionally, the transceiver unit 142 may be configured to receive the location information of UE 104, or the location information of the mobile object.

Figure 15:
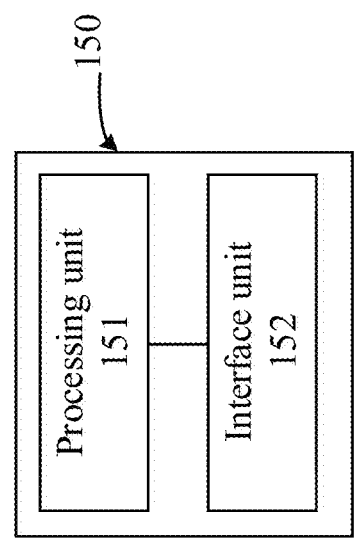
FIG. 15 is a block diagram of a network node in an embodiment.

FIG. 15 is a block diagram of a network node 150 in an embodiment. The network node may comprise the node 106. The network node 150 comprises a processing unit 151 and an interface unit 152. The processing unit 151 and the interface unit 152 as illustrated in FIG. 15 may be implemented with one or more features of any one or more of the embodiments set forth in any previous and/or subsequent figure(s) and/or the description thereof.

The processing unit 151 is configured to perform a ray tracing simulation to identify a ray that transmits from a location of the access device 102 and reach a location of a simulated UE. The mobile object information may be considered in the ray tracing simulation. Specifically, the processing unit 151 may be configured to identify a ray that is capable of reaching a location of a simulated UE according to static object information of an area where the access device 102 is located and a location of a simulated mobile object. Moreover, the processing unit 151 may be further configured to determine the prediction function parameter according to the identified ray and the location of the simulated UE. For example, the processing unit 151 may perform machine learning to determine the prediction function parameter.

The interface unit 152 is configured to send the prediction function parameter to the access device 102.

One embodiment of the present disclosure discloses a millimeter-wave (mm-wave) communication method, comprising: determining, by an access device, at least one transmission path between the access device and a user equipment (UE) in accordance with a prediction function parameter, and a location of the UE and a location of at least one mobile object; determining, by the access device, a mm-wave beam according to the transmission path; and communicating, by the access device, with the UE via the mm-wave beam.

Another embodiment of the present disclosure discloses an access device, comprising: a non-transitory memory storing instructions; and one or more processors in communication with the non-transitory memory, wherein the one or more processors execute the instructions to determine least one transmission path between the access device and a user equipment (UE) in accordance with a prediction function parameter, and a location of the UE and a location of at least one mobile object; determine a mm-wave beam according to the transmission path; and communicate with the UE via the mm-wave beam.

An embodiment provides a non-transitory computer-readable media storing computer instructions that when executed by one or more processors, cause the one or more processors to determine least one transmission path between the access device and a user equipment (UE) in accordance with a prediction function parameter, a location of the UE, and a location of at least one mobile object; determine a mm-wave beam according to the transmission path; and communicate with the UE via the mm-wave beam.

Optionally, in one example, before determining at least one transmission path, the method further comprises identifying, by the access device using a ray tracing simulation, a ray that is capable of reaching a location of a simulated UE according to static object information of an area at where the access device is located and a location of a simulated mobile object, the ray is transmitted from a location of the access device; and determining, by the access device, the prediction function parameter according to the identified ray and the location of the simulated UE. Alternatively, before determining at least one transmission path, the method further comprises receiving, by the access device, the prediction function parameter from a network node; wherein the prediction function parameter is determined by the network node according to a ray that is capable of reaching a simulated UE and a location of the simulated UE, the ray is identified in a ray tracing simulation according to static object information of an area where the access device is located and a location of a simulated mobile object, where the ray is transmitted from a location of the access device.

Optionally, in one example, the prediction function parameter comprises a polynomial function, with the location of the UE and the location of the at least one mobile object comprising inputs to the polynomial function.

In one example, the mm-wave beam comprises a receiving mm-wave beam of the access device; wherein determining the mm-wave beam comprises mapping, by the access device, the at least one transmission path to multiple mm-wave beams of the access device; determining, by the access device, a number of at least one transmission path mapped to each one of the multiple mm-wave beams of the access device; and determining, by the access device, a mm-wave beam having a maximum number of the mapped at least one transmission path as the receiving mm-wave beam of the access device.

In one example, the mm-wave beam comprises a receiving mm-wave beam of the access device; wherein determining the mm-wave beam comprises receiving, by the access device, information of a beam pair from the UE; and determining, by the access device, a receiving mm-wave beam in the beam pair as the receiving mm-wave beam of the access device.

In one example, the mm-wave beam comprises a transmitting mm-wave beam of the access device; wherein determining the mm-wave beam comprises determining, by the access device, at least one beam pair including a transmitting mm-wave beam and a receiving mm-wave beam, the transmitting mm-wave beam and the receiving mm-wave beam cover at least one same transmission path; and determining, by the access device, a transmitting mm-wave beam in a beam pair with a maximum number of the covered at least one same transmission path as the transmitting mm-wave beam of the access device.

In one example, the mm-wave beam comprises a transmitting mm-wave beam of the access device; wherein determining the mm-wave beam comprises determining, by the access device, at least one beam pair including a transmitting mm-wave beam and a receiving mm-wave beam, the transmitting mm-wave beam and the receiving mm-wave beam cover at least one same transmission path; assigning, by the access device, a weight to each one of the at least one transmission path; determining, by the access device, a sum of weights of all transmission path in each one of the at least beam pair; and determining, by the access device, a transmitting mm-wave beam in a beam pair with a largest summed weights as the transmitting mm-wave beam of the access device. Optionally, the weight is assigned according to at least one of a length of the at least one transmission path, or a position of the at least one of the transmission path in a receiving beam pattern of the UE and in a transmitting beam pattern of the access device.

One embodiment of present disclosure provides a computer storage medium for storing computer software comprising programs for executing methods of above embodiments.

One embodiment of present disclosure provides a chipset system, the chipset system includes a processor that is used to implement the functionality of the UE 104, the access device 102, or the node 106. The chipset system may further include a memory for storing program instructions and data. The chipset system may be comprised of chipsets, and may also be comprised by at least one of chipsets and other discrete device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by other units/modules. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The terminology used in the description of the present disclosure is for the purpose of describing particular embodiments only and is not intended to be limiting of the present disclosure. As used in the description of the present disclosed and the appended claims, the singular forms "a", "an" and "the" are intended to include the plural forms as well, unless the context clearly indicates otherwise. In the embodiments of the present disclosure, "at least one" means one or multiple. The term "multiple" means two or more than two. The term "and/or" describes a relationship between the associated items. The term "and/or" may represent three relationships. For example, "A and/or B" may represent situations of A independently, A and B concurrently, and B independently. Where A and B could be singular or plural. The symbol "/" usually means "or" of the associated items. The expression "at least one item of" or similar expressions may mean any combination of the items, including any combination of singular item, or the plural of items. For instance, at least one of a, b, or c may comprise a, b, c, a plus b, a plus c, b plus c, or a plus b plus c, where a, b, c may be singular, or may be plural.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A millimeter-wave (mm-wave) communication method, comprising:
   a network device inputting a user equipment (UE) location into a beam prediction engine to generate a set of mm-wave beams, with the beam prediction engine generating the set of mm-wave beams based on at least one static object within a coverage area of an access device;
   the network device inputting at least one mobile object location of at least one mobile object into the beam prediction engine to select a subset of mm-wave beams from the set of mm-wave beams, with the beam prediction engine selecting the subset of mm-wave beams based on the at least one static object and the at least one mobile object; and
   the network device selecting at least one mm-wave beam from the subset of mm-wave beams.

2. The method according to claim 1, with the set of mm-wave beams being generated with respect to a static object location of the static object and at least one simulated mobile object location.

3. The method according to claim 1, with the set of mm-wave beams being generated with respect to a static object location, at least one simulated mobile object location, and at least one simulated UE location.

4. The method according to claim 1, with the set of mm-wave beams being generated with respect to at least one simulated UE location.

5. The method according to claim 1, with the network device comprising the access device.

6. The method according to claim 1, with the network device comprising a UE.

7. The method according to claim 1, with the selecting the mm-wave beam comprising selecting a transmit beam.

8. The method according to claim 1, with the selecting the mm-wave beam comprising selecting a receive beam.

9. A network device, comprising:
   a non-transitory memory storing instructions; and
   one or more processors in communication with the non-transitory memory, wherein the one or more processors execute the instructions to:
   input a user equipment (UE) location into a beam prediction engine to generate a set of mm-wave beams, with the beam prediction engine generating the set of mm-wave beams based on at least one static object within a coverage area of an access device;
   input at least mobile object location of at least one mobile object into the beam prediction engine to select a subset of mm-wave beams from the set of mm-wave beams, with the beam prediction engine selecting the subset of mm-wave beams based on the at least one static object and the at least one mobile object; and
   select a mm-wave beam from the subset of mm-wave beams.

10. The network device according to claim 9, with the network device comprising the access device.

11. The network device according to claim 9, with the network device comprising a UE.

12. The network device according to claim 9, with the one or more processors executing the instructions to:
    generate the set of mm-wave beams with respect to a static object location of the static object and at least one simulated mobile object location.

13. The network device according to claim 9, with the one or more processors executing the instructions to:
    generate the set of mm-wave beams with respect to a static object location, at least one simulated mobile object location, and at least one simulated UE.

14. The network device according to claim 9, with the one or more processors executing the instructions to:
    generate the set of mm-wave beams with respect to at least one simulated UE.

15. The network device according to claim 9, with the one or more processors executing the instructions to select a transmit beam.

16. The network device according to claim 9, with the one or more processors executing the instructions to select a receive beam.

17. A non-transitory computer-readable media storing computer instructions that when executed by one or more processors, cause the one or more processors to perform the steps of:
    input a user equipment (UE) location into a beam prediction engine to generate a set of mm-wave beams, with the beam prediction engine generating the set of mm-wave beams based on at least one static object within a coverage area of an access device;
    input at least one mobile object location of at least one mobile object into the beam prediction engine to select a subset of mm-wave beams from the set of mm-wave beams, with the beam prediction engine selecting the subset of mm-wave beams based on the at least one static object and the at least one mobile object; and
    select a mm-wave beam from the subset of mm-wave beams.

18. The non-transitory computer-readable media according to claim 17, with the computer instructions being executed by the one or more processors to further perform the step of:
    generate the set of mm-wave beams with respect to a static object location of the static object and at least one simulated mobile object location.

19. The non-transitory computer-readable media according to claim 17, with the computer instructions being executed by the one or more processors to further perform the step of:
    generate the set of mm-wave beams with respect to a static object location, at least one simulated mobile object location, and at least one simulated UE location.

20. The non-transitory computer-readable media according to claim 17, with the computer instructions being executed by the one or more processors to further perform the step of:

generate the set of mm-wave beams with respect at least one simulated UE location.

\* \* \* \* \*